United States Patent [19]
Shintaku et al.

[11] Patent Number: 6,101,471
[45] Date of Patent: Aug. 8, 2000

[54] APPARATUS AND METHOD FOR PROCESSING VOICES, AND STORAGE MEDIUM USING ATTRIBUTE DATA

[75] Inventors: Yoshihiro Shintaku; Shuzo Kugimiya, both of Nara, Japan

[73] Assignee: Sharp Kabushiki Kaisha, Osaka, Japan

[21] Appl. No.: 09/169,392

[22] Filed: Oct. 9, 1998

[30] Foreign Application Priority Data

Oct. 9, 1997 [JP] Japan .................................. 9-277627

[51] Int. Cl.[7] ............................ G10L 15/26; H04M 3/48
[52] U.S. Cl. ...................... 704/270; 704/273; 379/88.13; 379/207; 379/209
[58] Field of Search .................................. 704/273, 270; 379/88.13, 207, 209

[56] References Cited

U.S. PATENT DOCUMENTS

| | | | |
|---|---|---|---|
| 5,014,317 | 5/1991 | Kita et al. | 381/43 |
| 5,381,466 | 1/1995 | Shibayama et al. | 379/88 |
| 5,742,674 | 4/1998 | Jain et al. | 379/209 |
| 5,848,132 | 12/1998 | Morley et al. | 379/209 |
| 5,872,841 | 2/1999 | King et al. | 379/88.13 |

FOREIGN PATENT DOCUMENTS

| | | |
|---|---|---|
| 0 586 954 A2 | 3/1994 | European Pat. Off. . |
| 3-32148 | of 0000 | Japan . |
| 3-38721 | of 0000 | Japan . |
| 3-88592 | of 0000 | Japan . |
| 63-233639 | 9/1988 | Japan . |
| 05236075 | 9/1993 | Japan . |

OTHER PUBLICATIONS

"Voice Activated Meeting Scheduling Mechanism," IBM Technical Disclosure Bulletin, vol. 37, No. 4A, Apr. 1, 1994.

*Primary Examiner*—David R. Hudspeth
*Assistant Examiner*—Susan Wieland
*Attorney, Agent, or Firm*—Dike, Bronstein, Roberts & Cushman, LLP; David G. Conlin

[57] ABSTRACT

An object of the present invention is to convert a voice to a character string and output attribute data associated with the character string. The central controller of the data processing apparatus converts a voice entered from the voice input unit through the voice/character code conversion processing to a character string. Then, any date and time part of the character string are detected through the date detection processing and the time detection processing and the detected date and time part are converted to predetermined date and time words through the date conversion processing and the time conversion processing. Finally, the converted date and time are associated to a voice and a character string as attribute data through the monitor controlling and stored in the schedule memory as schedule data. Consequently, the date and time are associated to a voice and a character string automatically. The current date and time clocked by the clocking unit are also used as such attribute data, so that either of any detected date and time part or the current date and time are selected and used.

13 Claims, 27 Drawing Sheets

APPARATUS AND METHOD FOR PROCESSING VOICES, AND STORAGE MEDIUM USING ATTRIBUTE DATA

BACKGROUND OF THE INVENTION

1. Field of the Invention

The present invention relates to an apparatus and a method for processing voices, which can accept voice input of data, as well as a storage medium for materializing the apparatus and the method, more particularly to an apparatus, a method, and a storage medium usable for a data processing apparatus for managing schedules.

2. Description of the Related Art

Conventionally, so-called schedule books used to manage schedules have been made of paper. Dates and times, as well as other schedule items on those dates and times have been individually written by the user using a writing implement respectively. In recent years, however, data processing apparatuses such as electronic notebooks, personal computers and potable data terminals, and software programs used for managing schedules in those data processing apparatuses have been spread. Under such the circumstances, schedule books have been replaced with those data processing apparatuses and schedule managing software programs are executed in such data processing apparatuses to manage personal schedules. There are also cases that a plurality of persons are managing the progress of their group work carried out in cooperation using a method conforming to the above personal schedule management to make it easier to operate the management.

Such schedule data used basically for managing schedules is composed of date and time data, as well as other schedule items. For example, if a schedule is a meeting with a customer, the schedule items will indicate the meeting place and the customer's name. If this schedule is notified from the customer to the user by telephone, the user will know the schedule in the talking with the customer using voices. The user will then divide the schedule data into the date and time and other schedule items and enter the data to his/her data processing apparatus manually. The manual input of data mentioned here device entering the data, for example, characters and symbols representing the date and time, as well as other schedule items by operating, for example, a keyboard manually. In the present specification, it is noted that a voice not only a human voice but also a sound, for example, a synthesized sound.

If the user's telephone is an automatic phone-answering machine and the user is away on a business trip, for example, when a customer makes a phone call, the voice of the customer is stored as is in the memory of the automatic phone-answering machine. The user thus listens to the voice stored in the memory thereby to know the schedule data as soon as he/she returns. The user then divides the schedule data into the date and time and other schedule items thereby to enter the schedule data in his/her data processing apparatus manually. The data processing apparatus regards the date and time as attribute data for classifying the entered schedule data, then makes the date and time correspond to other schedule items and stores them all. The apparatus then classifies and disposes a plurality of stored schedule data according to the date and time.

Since the user enters the schedule data to his/her data processing apparatus manually when receiving schedule data as a voice such way, sometimes wrong schedule data is entered, for example, because of the user's mishearing of the schedule data and/or mishandling of his/her input device. In order to prevent such schedule data errors, there is proposed a method that the data processing apparatus or the telephone itself recognizes a voice and the voice outputted from the telephone are converted to a character string composed of a plurality of characters.

The applicant of the present invention thus proposes a video telephone system disclosed in Japanese Unexamined Patent Publication JP-A-3-88592 as the first related art voice recognition technology. This video telephone system, when used as a receiver, converts a voice data to character data and displays the character data visually to transmit the user's intention of the video telephone system used as a transmitter to the user of the video telephone system used as a receiver easily and accurately regardless of the voice sensitivity of the video telephone system and existence of noises around the video telephone system.

As the second related art voice recognition technology, the inventor proposes a voice recognition telephone set disclosed in Japanese Unexamined Patent Publication JP-A-3-32148. This voice recognition telephone requests the user to hold down a recognition button only while the talker is giving his/her address to the user orally. This is to eliminate both troublesome manual input and check of an address given by telephone. While the recognition button is held down, the telephone recognizes signals representing a voice on the telephone line as a voice and stores the result of recognition.

Furthermore, as the third related art voice recognition technology, the inventor proposes a message slip output device disclosed in Japanese Unexamined Patent Publication JP-A- 3-38721. This message slip output device requests the user to hold down any one of its plural buttons while the user or the talker is giving words to be described on a message slip, so that the message addressed with a voice is described on a message slip automatically. While the button is held down, the voice entered to a microphone is recognized and converted to character codes, then described in a blank field on the message slip corresponding to the button.

The character data, the result of recognition, and the character codes described above are all put together into a character string. This character string can be divided into a plurality of words. In those related art technologies described above, the relationship among the words of the character string, that is, the meaning of each word is not analyzed yet. If any of those related art voice recognition technologies is used as is for entering the above schedule data, therefore, the user must read the character string and grasp the meaning of each word thereby to specify each word appropriately to represent the object date and time, as well as other schedule items from the character string based on the meaning of each word. This is why the user may make a mistake in recognition of the meaning and specification of words. In the case of the voice recognition technologies in the second and third related arts used as described above, the user must hold down the recognition button or any one of the plural buttons just when an object voice is spoken. And, this will make it difficult to operate and easy to make errors. In addition, the user must judge whether to recognize the voice by himself/herself, and accordingly, the user will make errors in such a judgment.

In other words, the user must make an operation any way to select and use part of a voice as, for example, attribute data according to the meaning of each word used as an index in those voice recognition technologies. Consequently, word input errors will occur due to various operation errors caused by the user himself/herself when in handling.

There is also a case that both voices and character strings obtained by the first to third related art voice recognition technologies are used in the data processing apparatus collectively without considering the meaning of each word. This data processing apparatus, which is, for example, a computer that executes an application software, includes those which correspond any date and time to a voice and a character string as attribute data just like a data processing apparatus for schedule management.

In those voice recognition technologies, when a voice is obtained, neither date nor time is stored. No date and time thus correspond to any of voices and character strings. When a voice and a character string are used in the data processing apparatus, therefore, the data processing apparatus must obtain the corresponding date and time by itself. The number of processing steps is thus increased in such a data processing apparatus. There is also another case that an accumulated voice that has neither date nor time as a voice stored in the memory of an automatic phone-answering machine, that is, a voice stored on an unknown date and time, is used in this data processing apparatus. In such a case, since it is very difficult for the data processing apparatus to guess the date and time on which the voice is stored, it is difficult to use the voice.

SUMMARY OF THE INVENTION

Under such circumstances, it is an object of the present invention to provide an apparatus and a method for processing voices, which can convert a voice to a character string and automatically output at least either the voice or the character string with associated attribute data which represents an attribute such as date and time. It is also an object of the invention to provide a storage medium for storing programs to realize the apparatus and the method for processing voices.

In a first aspect of the invention a voice processing apparatus comprises voice inputting device for inputting a voice;
  voice/character string converting circuit for converting the inputted voice to a character string consisting of a plurality of characters;
  attribute data detecting circuit for detecting a part of the character string representing a predetermined attribute (hereinafter referred to as "attribute part of the character string") as attribute data which is used for classifying the voice and the character string; and
  outputting device for outputting at least either the voice or the character string and the attribute data in association with each other.

According to the first aspect of the invention, the voice processing apparatus, when a voice representing object data to be processed is entered and the data includes the attribute part of the data, detects the attribute part of the character string as attribute data automatically and outputs at least either the voice or the character string with the associated attribute data. Since attribute data is decided automatically such way, when this voice processing apparatus is used as input device of the data processing apparatus, it is possible for the user to omit the manual input of attribute data decided according to the entered voice into the data processing apparatus, although the work is needed when any unit realized by the first to third related art voice recognition technologies is used as input device. Consequently, in the first aspect of the invention, it is possible to prevent attribute data input errors caused by user's operation errors.

Furthermore, since a voice can be converted to a character string representing data represented by the voice automatically, if the user receives object data by voice from a third person, the voice is entered directly in voice input device, so that the voice processing apparatus itself can convert the voice to a character string automatically. When this voice processing apparatus is used as input device of the data processing apparatus, therefore, it is possible for the user to omit listening to the entered voice and enter a character string representing the data manually to the data processing apparatus, although the work is needed for the data processing apparatus that does not adopt any of the first to third related art voice recognition technologies. Consequently, in the first aspect of the invention, it is possible to prevent character string input errors caused by user's operation errors.

For those two reasons, it becomes possible to improve the reliability of the character string and the attribute data outputted from outputting device more than the character string and the attribute data entered by the user manually. In addition, since an input device for entering data by user of the data processing apparatus using this voice processing apparatus as input device is realized by the voice inputting device, for example, a microphone, it becomes possible to simplify the structure and controlling method of the input device more than the input device realized by a keyboard or a hand-written character recognizing unit for entering character strings. Consequently, it is possible to reduce the data processing apparatus in size easily, as well as to reduce the manufacturing cost.

In a second aspect of the invention the predetermined attribute is date and time.

According to the second aspect of the invention, since the predetermined attribute is any date and time, the voice processing apparatus detects date and time part of a character string (where "date and time part of a character string" means "the part representative of date and time in a character string") as attribute data. The reason and effect of the second aspect of the invention are as shown below. Any data whose attribute is date and time, that is, schedule data is often notified by voice via a telephone as described in the related art technologies. Consequently, when a voice outputted from the telephone speaker or a voice stored in the memory of an automatic phone-answering machine is entered to voice inputting device, the voice is automatically converted to a character string and the attribute data is automatically detected and outputted with at least either the voice or the character string which is associated therewith. For the reasons described in the first aspect of the invention, therefore, it becomes possible for the user to omit various operations needed to enter any data whose attribute is a date transmitted as a voice to the data processing apparatus. It is thus possible for the second invention to prevent input errors to be caused by such user's operations. And, it is also possible to improve the reliability of a character string representing any data whose attribute is a date, as well as the attribute data.

In a third aspect of the invention a voice processing apparatus comprises:
  voice inputting device for inputting a voice;
  voice/character string converting circuit for converting the entered voice to a character string consisting of a plurality of characters;
  attribute data setting circuit for setting attribute data which represents a predetermined attribute, the attribute data being used for classifying the voice and the character string; and
  outputting device for outputting at least either the voice or the character string and the attribute data in association with each other.

According to the third aspect of the invention, the voice processing apparatus, when object data is entered as a voice, automatically outputs the attribute data set by the attribute data setting circuit with at least the voice or character string associated therewith. Consequently, whether the voice and the character string include attribute part or not, the attribute data can be decided automatically. Consequently, if this voice processing apparatus is used as input device of a data processing apparatus that processes data according to attribute data, it becomes possible for the data processing apparatus to use both voice and character string whether the object data includes attribute part or not.

In the above case of the data processing apparatus, there is no need to decide attribute data for any voice and any character string according to a voice and a character string. Consequently, the data processing apparatus is not limited by whether or not the apparatus has a structure to be used for deciding attribute data. Thus, the data processing apparatus is less restricted for using voices and character strings, and accordingly it becomes easier for the apparatus to handle voices and character strings. This is why it is possible to improve the efficiency for the apparatus to use voices and character strings.

Furthermore, attribute data is decided automatically and a voice is converted to a character string automatically in the voice processing apparatus. For the reasons described in the first aspect of the invention, therefore, it is possible to improve the reliability of both character string and attribute data outputted from the outputting device of the data processing apparatus more than the character string and the attribute data entered by the user manually.

In a fourth aspect of the invention the voice processing apparatus further comprises clocking device for clocking the current date and time, wherein the attribute data setting circuit sets the current date and time clocked by the clocking device as attribute data when a voice is inputted from the voice inputting device.

According to the fourth aspect of the invention, the attribute data setting circuit of the voice processing apparatus sets the current date and time clocked by the clocking device as attribute data. Consequently, for example, when a voice which does not indicate any specific date and time is entered and stored in a memory of an automatic phone-answering machine to notify schedule data, the voice processing apparatus adds a date and time of the entry of the voice into the memory as attribute data to the voice and a character string obtained by converting the voice. Consequently, it is possible to improve the efficiency for using voices representing any data whose attribute is date and time respectively, as well as character strings for the reasons described in the third aspect of the invention. Furthermore, it is possible to improve the reliability of each character string representing the data and the attribute data.

In a fifth aspect of the invention a voice processing apparatus comprises:
voice inputting device for inputting a voice;
voice/character string converting circuit for converting the inputted voice to a character string consisting of a plurality of characters;
attribute data detecting circuit for detecting a predetermined attribute part of the character string as a first attribute data which is used for classifying the voice and the character string;
attribute data setting circuit for setting second attribute data representing the above attribute, the second attribute data being used for classify the voice and the character string;
attribute data selecting circuit for selecting either the first or second attribute data; and
outputting device for outputting at least either the voice or the character string and the attribute data selected by the attribute data selecting circuit in association with each other.

According to the fifth aspect of the invention, the attribute data selecting circuit of the voice processing apparatus selects attribute data to be associated with at least either a voice or a character string from the first and second attribute data. Consequently, the attribute data to be associated with at least either the voice and the character string can be selected freely, for example, in response to an instruction of the user. Consequently, it is possible to improve the controllability of the voice processing apparatus. In addition, when the user selects attribute data, the first and second attribute data are decided automatically by the attribute data detecting circuit and by the attribute data setting circuit respectively. Thus, it is possible to omit various operations when the user decides and enters attribute data manually. The number of user's operations can thus be reduced more than in a case that the user rewrites attribute data manually after the attribute data is associated with a voice and a character string. It is thus possible to prevent occurrence of input errors to be caused by user's operation errors.

In a sixth aspect of the invention the voice processing apparatus further comprises clocking device for clocking the current date and time, wherein the predetermined attribute is date and time, and the attribute data setting circuit sets the current date and time clocked by the clocking device as a second attribute data when the voice is inputted from the voice inputting device.

According to the sixth aspect of the invention, the predetermined attribute is any date and time. The attribute data detecting circuit of the voice processing apparatus thus detects date and time part of character string as the first attribute data. Furthermore, the attribute data setting circuit sets any date and time clocked by the clocking device as the second attribute data.

According to the sixth aspect of the invention composed as described above, therefore, a plurality of attribute data relate to date and time. Consequently, for the reasons described in the second and third aspects of the invention, it is possible to improve the reliability of a character string representing any data whose attribute is date and time, as well as the attribute data. In addition, by making the second attribute data associated with at least either a voice or a character string, it is possible to improve the efficiency for using voices representing any data whose attribute is date and time respectively, as well as character strings for the reasons described in the third aspect of the invention. Consequently, it is possible to improve the controllability of the voice processing apparatus that outputs any data whose attribute is date and time.

In a seventh aspect of the invention a voice processing apparatus further comprises schedule storing device for storing a schedule with an associated date and time, wherein the attribute data outputted from the outputting device is stored in the schedule storing device as date and time. And, at least either the voice or the character string outputted from the outputting device is stored in the schedule storing device as an expected item on the date and time.

According to the seventh aspect of the invention, the schedule storing device is used to manage schedules using the voice processing apparatus. And, since at least either the voice or the character string outputted from the outputting device, as well as the attribute data are stored in the schedule storing device as described above, at least either the voice or the character string, as well as the attribute data can be used as schedule data for managing schedules. In addition, since the voice processing apparatus described in the second, fourth, or sixth aspect of the invention is used as input device for entering schedule data to the schedule storing device, it is possible to reduce the work load of the user for entering schedule data more than the work load of any conventional schedule data input. Consequently, it is possible to prevent schedule data input errors caused by such user's operations. Consequently, it is possible to improve the reliability of schedule data. It is therefore possible to manage schedules more efficiently. In addition, if the voice processing apparatus of the seventh aspect of the invention is composed on the basis of the voice processing apparatus of the fourth aspect of the invention, it is possible to use voices for representing schedule data, although it has been difficult to use such voices while a schedule management software is executed in any conventional data processing apparatus.

In an eighth aspect of the invention a method for processing voices comprises the steps of:

allowing voice input;

converting the voice to a character string consisting of a plurality of characters;

detecting a part of the character string representing a predetermined attribute as attribute data which is used for classifying the voice and the character string; and associating at least either the voice or the character string with the attribute data.

According to the eighth aspect of the invention, in the method for processing voices, at first, the user is requested to enter a voice representing object data to be processed and the voice is processed as described above. Consequently, the attribute data is decided automatically and the voice is converted to a character string representing the data automatically. When this voice processing method is used for inputting data, therefore, it is possible to omit the user's operations for processing entered voice data, that is, operations for deciding attribute data, grasping the meaning of a voice, and entering a character string. Consequently, it is possible to prevent attribute data input errors caused by operations of the user himself/herself. It is also possible to improve the reliability of character strings and attribute data more than the reliability of the character strings and attribute data entered by the user. This voice processing method can also limit predetermined attribute only to date and time. If predetermined attribute is limited so, it is possible to improve the reliability of character strings representing any data whose attribute data is date and time respectively, as well as the attribute data associated with the character string more than the reliability of the character string and the attribute data entered by the user himself/herself.

In a ninth aspect of the invention a method for processing voices comprises the steps of:

allowing voice input;

converting the voice to a character string consisting of a plurality of characters;

setting attribute data representing a predetermined attribute, the attribute data being used for classifying the voice and the character string; and associating the attribute data with at least either the voice or the character string.

According to the ninth aspect of the invention, in the method for processing voices, at first, the user is requested to enter a voice representing object data to be processed to the voice processing apparatus and the voice is processed as described above. Consequently, the attribute data is decided automatically whether the data to be processed includes attribute part or not. The object data is thus processed according to the attribute data using at least either the voice or the character string obtained by this voice processing method, as well as the attribute data. In this processing, it is no need to decide attribute data for a voice and a character string newly. Consequently, this processing that uses a voice and a character string such way is not restricted by whether or not the method includes a processing step for deciding attribute data. It is thus possible to improve the efficiency for using voices and character strings.

In this voice processing method, since attribute data is decided automatically and a voice is converted to a character string automatically, it is possible to improve the reliability of character strings and attribute data more than the reliability of the character strings and attribute data entered by the user. This voice processing method can also limit a predetermined attribute only to date and time. If a predetermined attribute is limited so, it is possible to improve the efficiency for using voices representing any data whose attribute data is date and time respectively, as well as character strings and improve the reliability of a character string representing the data, as well as the attribute data.

In a tenth aspect of the invention a method for processing voices comprises the steps of:

allowing voice input;

converting the voice to a character string consisting of a plurality of characters;

detecting a part of the character string representing a predetermined attribute as a first attribute data which is used for classifying the voice and the character string;

setting a second attribute data representing the predetermined attribute, the second attribute data being used for classifying the voice and the character string;

selecting either the first or the second attribute data; and associating the selected attribute data with at least either the voice or the character string.

According to the tenth aspect of the invention, the voice processing method can select the attribute data to be associated with at least either the voice or the character string from the first and second attribute data. Consequently, the user can select the attribute data to be associated with at least either the voice or the character string freely. When the user selects the attribute data, the user can thus omit various operations for deciding and entering attribute data, since the first and second attribute data are decided automatically. It is thus possible to prevent attribute data input errors to be caused by user's input operations. This makes it easier to change attribute data more than any conventional method.

In an eleventh aspect of the invention, a computer program stored on a computer readable storage medium, comprises the processing of:

allowing voice input;

converting the voice to a character string consisting of a plurality of characters;

detecting a part of the character string representing a predetermined attribute as attribute data which is used for classifying the voice and the character string; and outputting at least either the voice or the character string and the attribute data in association with each other.

According to the eleventh aspect of the invention, the storage medium stores the above program for detecting attribute data from the character string and associating the attribute data with at least either the voice or the character string. When the program stored in this storage medium is read and executed by a general-purpose computer that can accept voice input, the computer can execute the same processings as those executed by the voice processing apparatus of the first aspect of the invention and the voice processing method of the eighth aspect of the invention. Consequently, it is possible to realize both apparatus and method for processing voices easily.

In a twelfth aspect of the invention, a computer program stored on a computer readable storage medium, comprises the processing of:

allowing voice input;

converting the voice to a character string consisting of a plurality of characters;

setting attribute data representing a predetermined attribute, the attribute data being used for classifying the voice and the character string; and outputting at least either the voice or the character string and the attribute data in association with each other.

According to the twelfth aspect of the invention, the storage medium stores the above program for associating independently set attribute data with at least either the voice or the character string. When the program stored in this storage medium is read and executed by a general-purpose computer that can accept voices, the computer can execute the same processings as those executed by the voice processing apparatus of the second aspect of the invention and the voice processing method of the ninth aspect of the invention. Consequently, it is possible to realize both apparatus and method for processing voices easily.

In a thirteenth aspect of the invention, a computer program stored on a computer readable storage medium, comprises the processing of:

allowing voice input;

converting the voice to a character string consisting of a plurality of characters;

detecting a part of the character string representing a predetermined attribute as a first attribute data which is used for classifying the voice and the character string;

setting a second attribute data representing the predetermined attribute, the second attribute data being used for classifying the voice and the character string;

selecting either the first or the second attribute data; and outputting at least either the voice or the character string and the selected attribute data in association with each other.

According to the thirteenth aspect of the invention, the storage medium stores the above program for selecting two types of attribute data and associating the two attribute data with at least either the voice or the character string. When the program stored in this storage medium is read and executed by a general-purpose computer that can accept voices, the computer can execute the same processings as those executed by the voice processing apparatus of the fifth aspect of the invention and the voice processing method of the tenth aspect of the invention. Consequently, it is possible to realize both apparatus and method for processing voices easily.

BRIEF DESCRIPTION OF THE DRAWINGS

Other and further objects, features, and advantages of the invention will be more explicit from the following detailed description taken with reference to the drawings wherein:

FIG. 12 is a block diagram for a concrete functional configuration of the data processing apparatus 1 composed of a first voice processing apparatus 51x and a schedule management unit 52a.

FIG. 16 is a block diagram for a concrete functional configuration of the data processing apparatus 1 composed of a second voice processing apparatus 51y and the schedule management unit 52a.

FIG. 22 is a block diagram for a concrete functional configuration of the data processing apparatus 1 composed of the third voice processing apparatus 51z and the schedule management unit 52a.

DETAILED DESCRIPTION OF THE PREFERRED EMBODIMENTS

Figure 1:
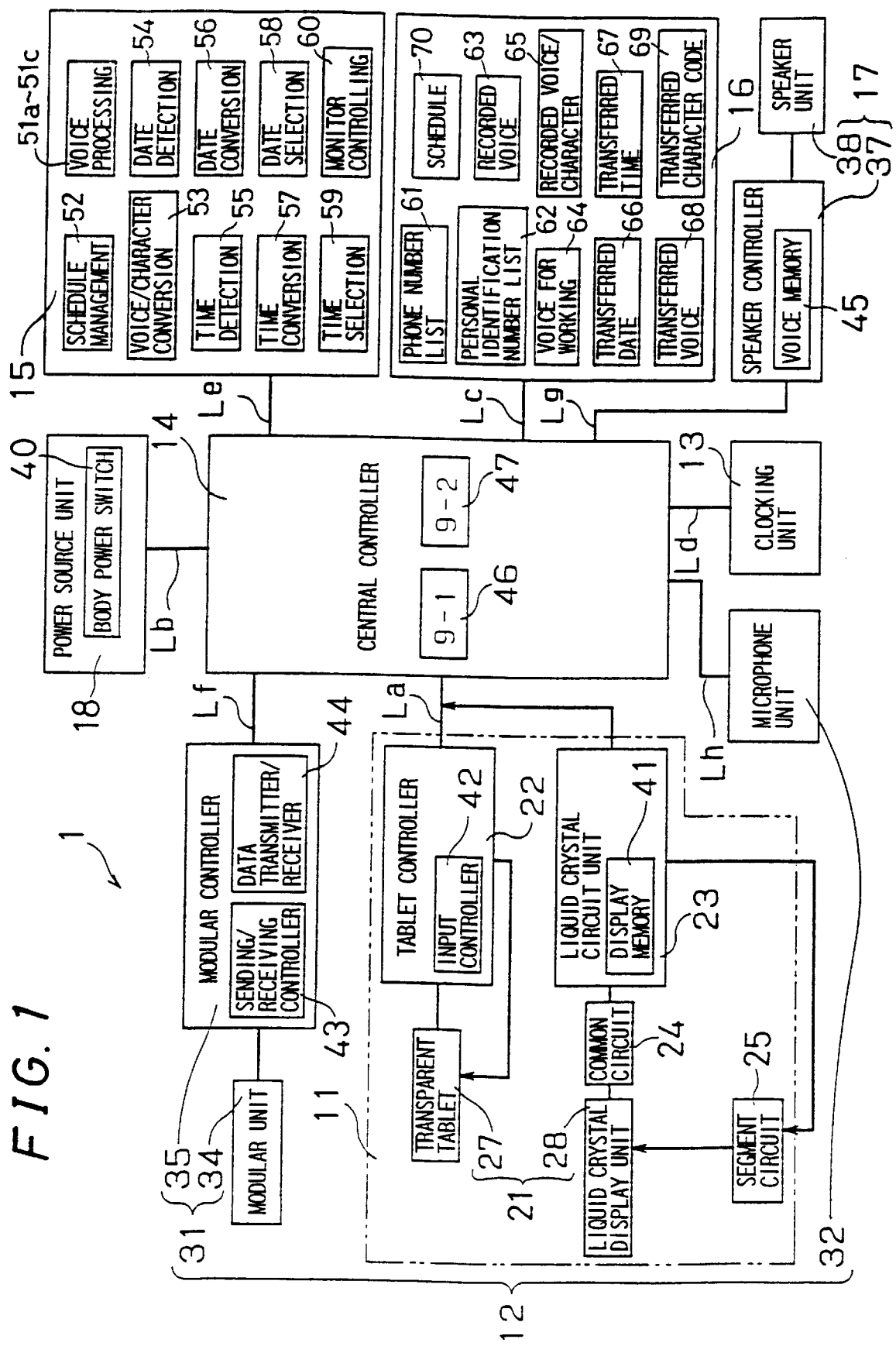
FIG. 1 is a block diagram for an electric configuration of a data processing apparatus 1 in the first embodiment of the present invention.

Now referring to the drawings, preferred embodiments of the invention a re described below.

Figure 2:
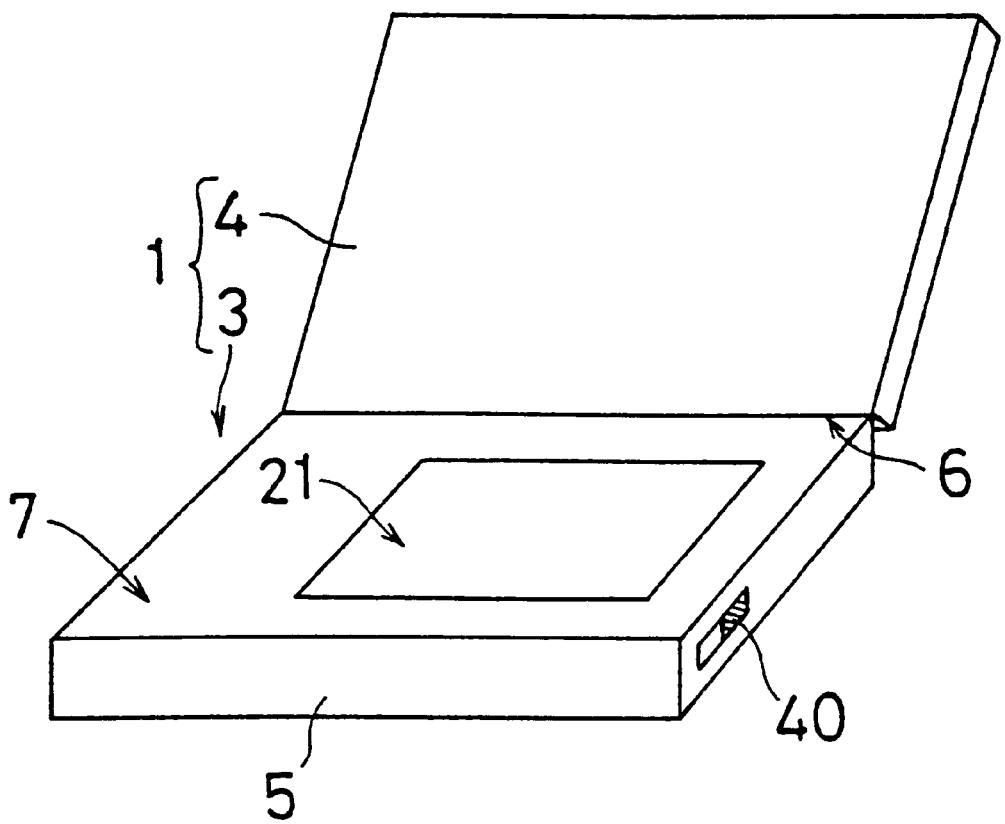
FIG. 2 is an external perspective view of the data processing apparatus 1.

FIG. 1 is a block diagram for an electrical configuration of a data processing apparatus 1 in the first embodiment of the present invention. FIG. 2 is an external perspective view of the data processing apparatus 1. The first embodiment of the invention will be described with reference to FIGS. 1 and 2.

The data processing apparatus 1 comprises a body 3 and a cover 4. The body 3 of the data processing apparatus 1 is shaped approximately like a rectangle. At part of the body 3 is provided a housing member for housing a pen, which is a rod-like member. The body 3 includes an operation display unit 11, a voice input unit 12, a clocking unit 13, a central controller 14, memories 15 and 16, a voice output unit 17, and a power source unit 18. The operation display unit 11 includes an input/output unit 21, a tablet controller 22, a liquid crystal circuit unit 23, a common circuit 24, and a segment circuit 25. The input/output unit 21 includes a transparent tablet 27 and a liquid crystal display unit 28. The liquid crystal circuit unit 23 includes a display memory 41. The tablet controller 22 includes an input controller 42. The voice input unit 12 includes a modem unit 31 and a microphone unit 32. The modem unit 31 includes a modular unit 34 and a modular controller 35. The modular controller 35 includes a sending and receiving controller 43 and a data transmitter/receiver 44. The voice output unit 17 includes a speaker controller 37 and a speaker unit 38. The speaker controller 37 includes a voice memory 45. The power source unit 18 includes a body power switch 40. The data processing apparatus 1 may be a personal computer, a portable data terminal, or an electronic notebook, for example.

The above components 11 to 18 are all housed in a cabinet 5 of the body 3. The input/output unit 21 is uncovered with the surface 7 of the cabinet 5. The body power switch 40 is also uncovered with the cabinet 5. The cover 4 is a rectangular flat plate-like member. The cover 4 is attached to the cabinet 5 with hinges so that a corner of the cover 4 comes almost in contact with one corner 6 of a side of the surface 7 of the cabinet 5. The cover 4 can thus be rotated around the corner manually so as to cover the exposed portion of the input/output unit 21 on the surface 7 of the cabinet 5. For example, when in transportation of the data processing apparatus 1, the cover 4 covers the exposed portion of the input/output unit 21, thereby the input/output unit 21 is protected.

In general, the voice input unit 12 is device for inputting various kinds of data to be processed as voices. The microphone unit 32 is composed of a microphone and some peripheral devices related to the operation of the microphone. A voice entered to the microphone is converted to, for example, a voice signal, which is a digital electric signal and output to the central controller 14 via a control line Lh. The modular unit 34 is composed of, for example, a terminal and a peripheral device used to connect a public line of a telephone line network to the data processing apparatus 1. The modular controller 35 controls the modular unit 34 thereby to transmit/receive voice signals to/from telephones and other data processing apparatuses via a public line. The modular controller 35 also supplies received voice signals to the central controller 14. Voices are handled as voice signals in the data processing apparatus 1. In this specification, therefore, actual voices and voice signals are referred to as "voices" generically.

In general, the operation display unit 11 is used as display device for displaying various kinds of data for the operator in the data processing apparatus and as operation device for instructing the data processing apparatus 1 from the operator concurrently. The clocking unit 13 may be a so-called RTC.

The clocking unit 13 clocks the current date (day, month, and year) and the time in accordance with the clock signal supplied from the central controller 14 via a control line Ld or the clock signal supplied from a clock circuit provided in the clocking unit 13. The clocking unit 13 outputs the current date and time to the central controller 14 via the control line Ld.

The memories 15 and 16 are connected to the central controller 14 via control lines Le and Lc. The memory 15 stores operation programs and invariable control data of the central controller 14. The memory 16 stores variable data to be referenced when the central controller 14 executes the operation program stored in the memory 15. The memory 16 is divided into a plurality of areas and each of those memory areas are regarded as an individual memory. The memory 15 may be, for example, a nonvolatile memory, which is a read only memory (ROM). The memory 16 may be, for example, a writable memory, which is a random access memory (RAM). The central controller 14 transmits/receives control signals and other signals representing various kinds of data to/from the components 22, 23, 40, 16, 13, 15, 35, 37, and 32 connected to itself via control lines La to Lh by executing operation programs stored in the memory 15, thereby to control operations including inputs/outputs of data to/from those components. In addition, the central controller 14 includes multiplexers 46 and 47.

Hereunder, it is premised that the memory 15 stores the main control programs 51a to 51c for the first to third voice data processings, as well as the main control program 52 for a schedule management function. The schedule management function is used to classify, dispose, and store schedule data composed of date and time data, as well as other expected items on the date and time according to the date and time (attribute data) and manages a schedule according to the schedule data. A voice data processing is an operation to enter a voice representing any date and time and convert the voice to a character string, which is a collection of characters so that the date and time is automatically outputted with the voice and character string. The concept of characters includes kanji characters, kana characters, symbols, and alphanumerics. In the data processing apparatus 1, a single character is handled as a so-called character code, which is a numeral consisting of a plurality of digits. In this specification, those kanji and kana characters, symbols, and alphanumerics are referred to "characters" generally regardless of how they are handled in the apparatus 1.

The memory 15 also stores sub-control programs (subroutines) used for processing voices. Concretely, the subroutines are used for the following processings; voice/character code conversion 53, date detection 54, time detection 55, date conversion 56, time conversion 57, date selection 58, time selection 59, and monitor controlling 60. Each divided area of the memory 16 is used as a telephone number list memory 61, a personal identification number list memory 62, a recorded voice memory 63, a voice memory 64 for working, a recorded voice/character code memory 65, a transferred date memory 66, a transferred time memory 67, a transferred voice memory 68, and a transferred character code memory 69 used for processing voices respectively. Each divided area of the memory 16 is also used as a schedule memory 70 for operating the schedule management function. Each of those operations and processings, as well as each memory will be described more later.

In general, the data processing apparatus 1 uses the voice output unit 17 as device for giving various kinds of data as voices for the convenience of the user. The speaker unit 38 is composed of a speaker and some peripheral devices related to the speaker operation. The voice memory 45 of the speaker controller 37 receives voice signals of data to be given as voices from the central controller 14 via a control line Lg. The speaker controller 37 converts the format of voice signals stored in the voice memory 45 to a format with which the signals can be outputted from the speaker as voices, then output to the speaker unit 38. Receiving the voice signals, the speaker unit 38 outputs the signals as an actual voice from the speaker. The power source unit 18 supplies a power to the components 11 to 18 in the body 3. The body power switch 40 is operated by the user and the state of the switch 40 is notified to the central controller 14 via the control line Lb. According to the state of the switch 40, the central controller 14 starts or stops power supply by the power source unit 18 to each of the components 11 to 18.

Furthermore, the body 3 may include a communication unit and an interface unit. The communication unit is used to transmit/receive signals to/from other data processing apparatuses. For example, the communication unit performs optical communications using an infrared beam. The interface unit converts the format of signals handled in the data processing apparatus 1 to transmit/receive signals to/from other data processing apparatuses, as well as the format of signals received by the communication unit to process the signals in the data processing apparatus 1. The interface unit is connected electrically to the central controller 14 via a control line. The communication unit is connected electrically to the central controller 14 directly via the interface unit or a control line. Both communication unit and interface unit are exposed from the cabinet 5 of the body 3.

Figure 3:
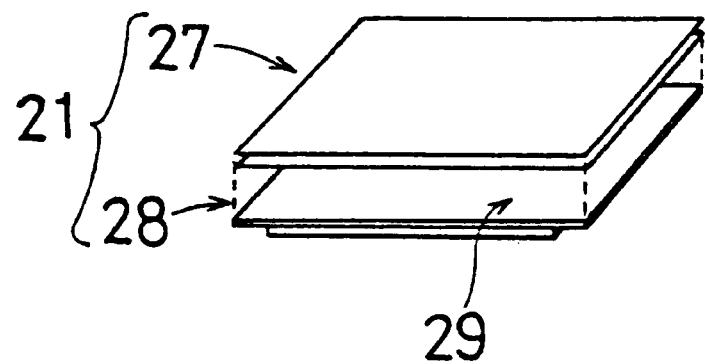
FIG. 3 is an exploded perspective view of a concrete structure of an input/output unit 21.

FIG. 3 is an exploded perspective view for a schematic structure of the input/output unit 21. The liquid crystal display unit 28 is composed of a liquid crystal display element of the active matrix method, which can display images. The liquid crystal display unit 28 has a flat display face 29 for displaying images. The transparent tablet 27 is a flat plate-like member that can cover the display face 29 of the liquid crystal display unit 28 completely. For example, the transparent tablet 27 may be composed of a touch panel. The transparent tablet 27 is disposed on top of the liquid crystal display unit 28 so as to cover the display face 29.

The liquid crystal display element of the active matrix method is schematically structured as follows. The liquid crystal display element includes a pair of substrate members and a liquid crystal layer. Each substrate member has electrodes and wirings disposed on one surface of the transparent flat plate substrate. The pair of substrate members are opposed to each other on one surface respectively with a space provided therebetween. The liquid crystal layer is put between those substrate members. The display face 29 is formed on the surface opposite to one surface of any one of the substrate members in such the state. This liquid crystal display element is divided into a plurality of pixel portions and those pixel portions are disposed like a matrix when viewed from the normal line of the display face 29. In each of those pixel portions, the liquid crystal layer is put between electrodes of both substrate members. At least one of the electrodes on both substrate members in this pixel portion is connected to the first wiring for supplying a common signal to the electrodes in all the pixels in a row or column including the pixel and the second wiring for supplying a common signal to all the pixels in a row or a column including the pixel. The first wiring is connected to the common circuit 24 and the second wiring is connected to the segment circuit 25.

When the liquid crystal display element is a transparent type one, a lighting unit is provided so that the light is lit into the liquid crystal display element from the opposite side of the display face 29. This lighting unit may be an EL element. When the liquid crystal display element is a reflection type one, a reflecting plate is provided so as to almost come in contact with the opposite side. In addition, when the electrodes disposed on a substrate member for which the opposite side is assumed as the other surface are made of a material that reflects lights, those electrodes may also be used as the above reflecting plate.

The touch panel is schematically structured as follows. The touch panel is composed of a pair of electrode members. Each of the electrode members is formed from translucent film-like electrodes provided at all over one surface of transparent flexible sheet-like members. On each of those electrodes are formed a plurality of protruded spacers at predetermined intervals. Those spacers are formed by printing, for example. These electrode members are disposed so as to be opposed to each other on the one surface of the sheet-like members with a space provided therebetween. At both ends of each electrode provided on each electrode member are attached a pair of detecting electrodes. A virtual axial line passing the center of each pair of detecting electrodes, when both electrode members are disposed as described above, are orthogonal when viewed from the normal line of the electrode member. The tablet controller 22 is connected electrically to the electrodes of the electrode member via each pair of detecting electrodes. Points on the surface of the transparent tablet 27 and points on the display face 29 of the liquid crystal display unit 28 are previously in one-to-one correspondence to each other. In the initial status when the user does not touch the transparent tablet 27 yet, the electrodes of the pair of electrode members of the transparent tablet 27 are partitioned by spacers, so they do not come in contact with each other.

Hereunder, an operation of the operation display unit 11 will be described in detail with reference to FIGS. 2 and 3. When the operation display unit 11 is used as display device, the liquid crystal circuit unit 23 stores image signals for specifying pixel portion to be lit in the liquid crystal display unit 28 in the display memory 41 as a bit map. The image signals, for example, are supplied from the central controller 14. The liquid crystal circuit unit 23 outputs signals for controlling the common circuit 24 and the segment circuit 25 to both circuits 24 and 25 according to the image signal. Consequently, the common circuit 24 and the segment circuit 25 output a predetermined combination of electric signals to two electrodes in each pixel portion via the first and second wirings. According to this combination of electric signals, a predetermined potential difference is generated between the two electrodes in each pixel portion, thereby the liquid crystal enters into the state corresponding to the potential difference. Consequently, the pixel portion comes on or goes off. The coming-on means that a light is transmitted into the liquid crystal of the pixel portion and the going-off means that the light is shut off the liquid crystal of the pixel portion. According to the distribution of pixel portions that come on and go off in the display face, an image is visualized on the display face 29.

When the operation display unit 11 is used as operating device, the user presses a point on the surface of the transparent tablet 27 with a finger or a pen in the initial status thereby to specify the point in the display face. Then, the electrode member at the specified point is deformed, so that the electrodes are short-circuited at the point. The input controller 42 of the tablet controller 22 detects the coordinates of the point at which the electrodes are short-circuited. To detect this coordinates, the controller 42 applies a slope voltage to either of the pair of electrodes and detects the voltage slope at the other electrode. The controller 42 executes this voltage slope detection twice by changing the electrodes to input and output the slope voltage. The central controller 14 checks the synchronization between the coordinates of the detected point and the image displayed on the liquid crystal display unit 28 to indicate the point in the image displayed on the display face corresponding to the detected point. The result of this synchronization check is used for the subsequent processings of the central controller 14.

Figure 4:
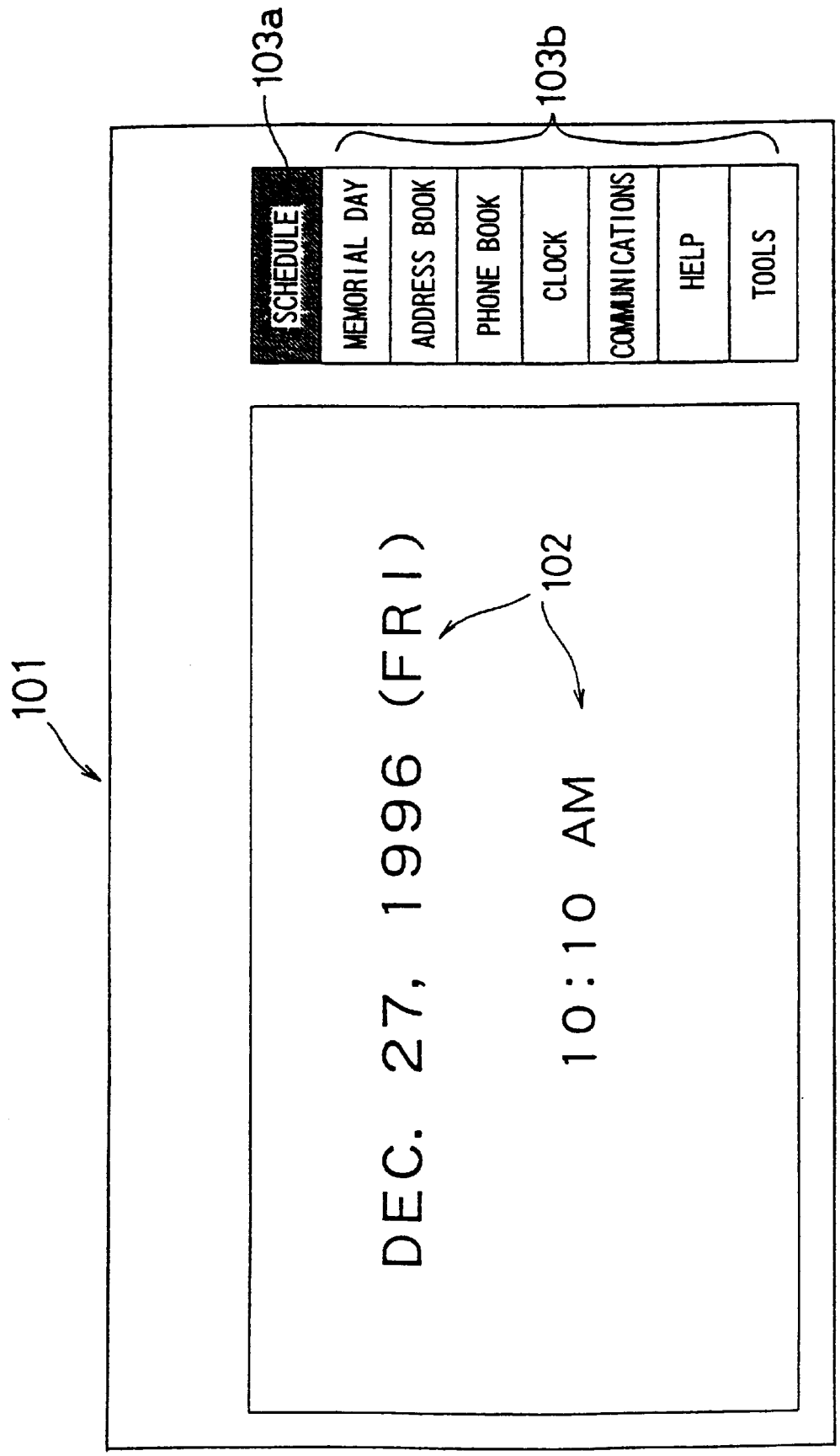
FIG. 4 illustrates an initial screen 101 of the data processing apparatus 1.
Figure 5:
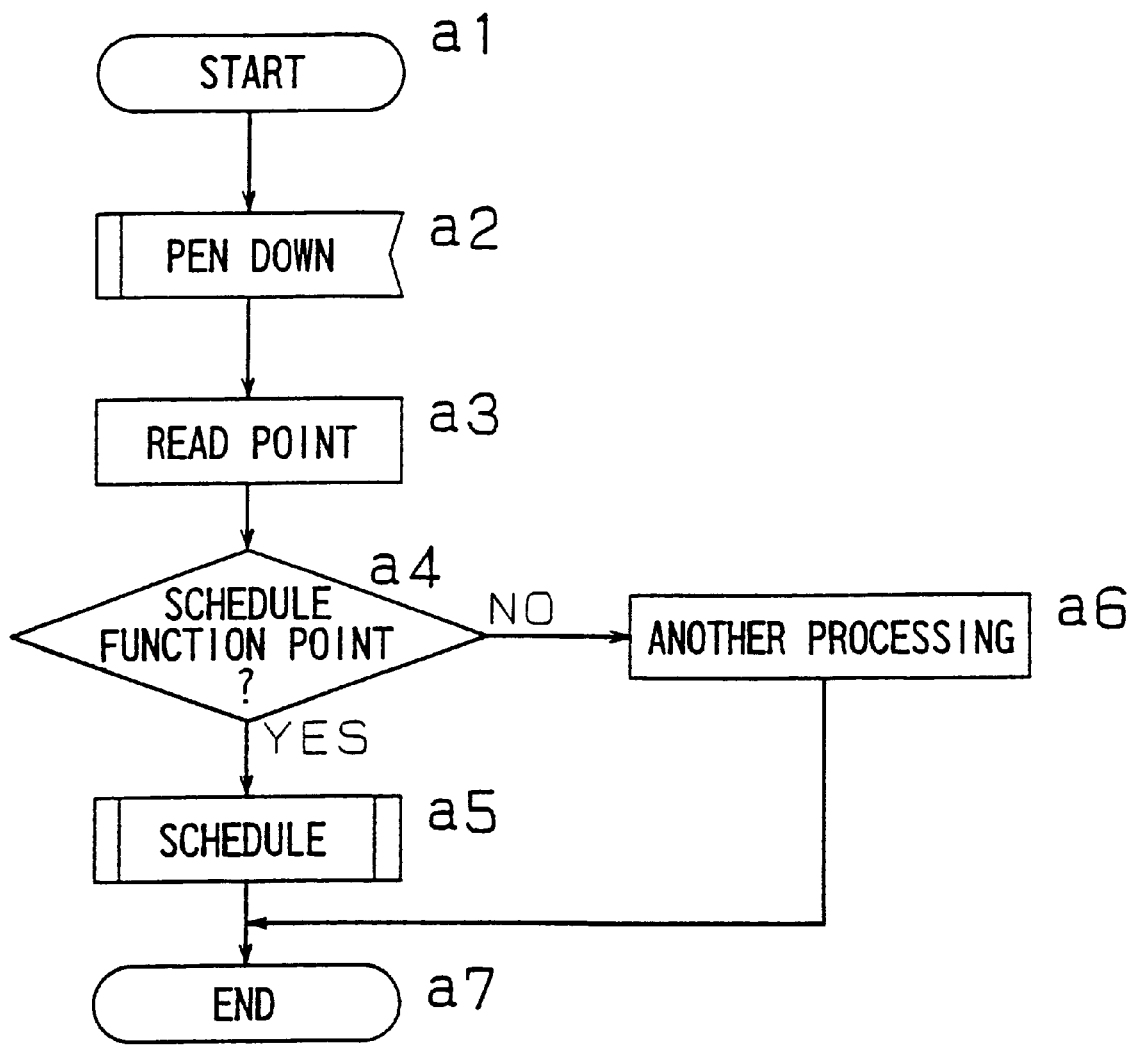
FIG. 5 is a flow chart describing an operation of the data processing apparatus 1 for selecting a function.

FIG. 4 illustrates an initial screen 101 displayed on the liquid crystal display unit 28 of the data processing apparatus 1. FIG. 5 is a flow chart indicating a schematic data processing for selecting a function. Hereunder, the function selecting will be described with reference to FIGS. 4 and 5.

The central controller 14 displays the initial screen 101 on the liquid crystal display unit 28 in the initial status when no main control program is executed for any function. The initial screen 101 includes the current date and time 102 composed of the current date (day, month, year, and day of the week) and the current time. Each of the data is represented by characters. The initial screen 101 also includes a plurality of buttons for selecting functions; a button 103a used to select a schedule management function and buttons 103b used to select another function. A button, which is one of divided image areas, corresponds to an item specified by the user. Each of those buttons is combined with the transparent tablet 27 to specify a command to the data processing apparatus 1 from the user. Another function may correspond to any operation as long as the data processing apparatus 1 can execute it. When executing of the schedule management function, the user presses the button 103a (obliquely striped portion). When using another button, the user presses a point on the transparent tablet 27 corresponding to the point in the object button within the display face 29.

While the initial screen 101 is displayed on the liquid crystal display unit 28, the central controller 14 goes to step a2 from step a1. In step a2, the transparent tablet 27 waits for an operation of the user. When the user presses a point on the surface of the tablet 27, the tablet 27 accepts an interruption for the operation of the input controller 42. This interruption is accepted only when a point pressed on the transparent tablet 27 is corresponding to a point in a button while the screen is displayed on the display face 29. Any other points are invalid. In step a3, the input controller 42 stops the current processing and detects the coordinates of the point pressed within the display face of the transparent tablet 27 when the transparent tablet 27 accepts the interruption. The coordinates of the detected point are then read by the central controller 14. Hereafter, the operation described in step a2 will be referred to as a "pen-down operations" and the operation described in step a3 will be referred to as a "point reading operation".

Next, the central controller 14 judges whether or not the button 103a is pressed in step a4. Concretely, to make this judgment, the central controller 14 judges whether or not the button includes the point within the display face 29 corresponding to the point within the surface of the transparent tablet 27 and being represented by the coordinates read in step a3. When judged YES, the controller 14 regards that the button is pressed. When judged NO, the controller 14 regards that the button is not pressed. When the button 103a is pressed, the central controller 14 goes to step a5 from step a4. Then, the central controller 14 executes the main control program for the schedule management function. Consequently, the central controller 14 functions as a schedule management unit 52a for managing schedules according to schedule data. When judged that the button 103a is not pressed, it is regarded that one of the buttons 103b is pressed. This is why an interruption is accepted only when a point on the transparent tablet 27 corresponding to a point within the object button is pressed for a pen-down operation. Thus, central controller 14 goes to step a6 from step a4. The central controller 14 then executes another function corresponding to the button 103b. After the processings in steps a5 and a6 are ended, the function selecting is ended in step a7.

FIGS. 6 to 9 illustrate screens displayed on the liquid crystal display unit 28 while the data processing apparatus 1 executes the schedule management function including the first voice processing. Each of those screens displays the current date and time 102 and buttons 103a and 103b used to select various functions. Description for those buttons will be omitted here, however. Hereunder, referring to those screens, it will be described briefly that how the user executes the schedule management function including the first voice processing. On each of the subsequent screens, each button pressed by the user will be striped obliquely. In addition, it is premised that voices representing schedule data are recorded in a plurality of automatic phone-answering machines.

Figure 6:
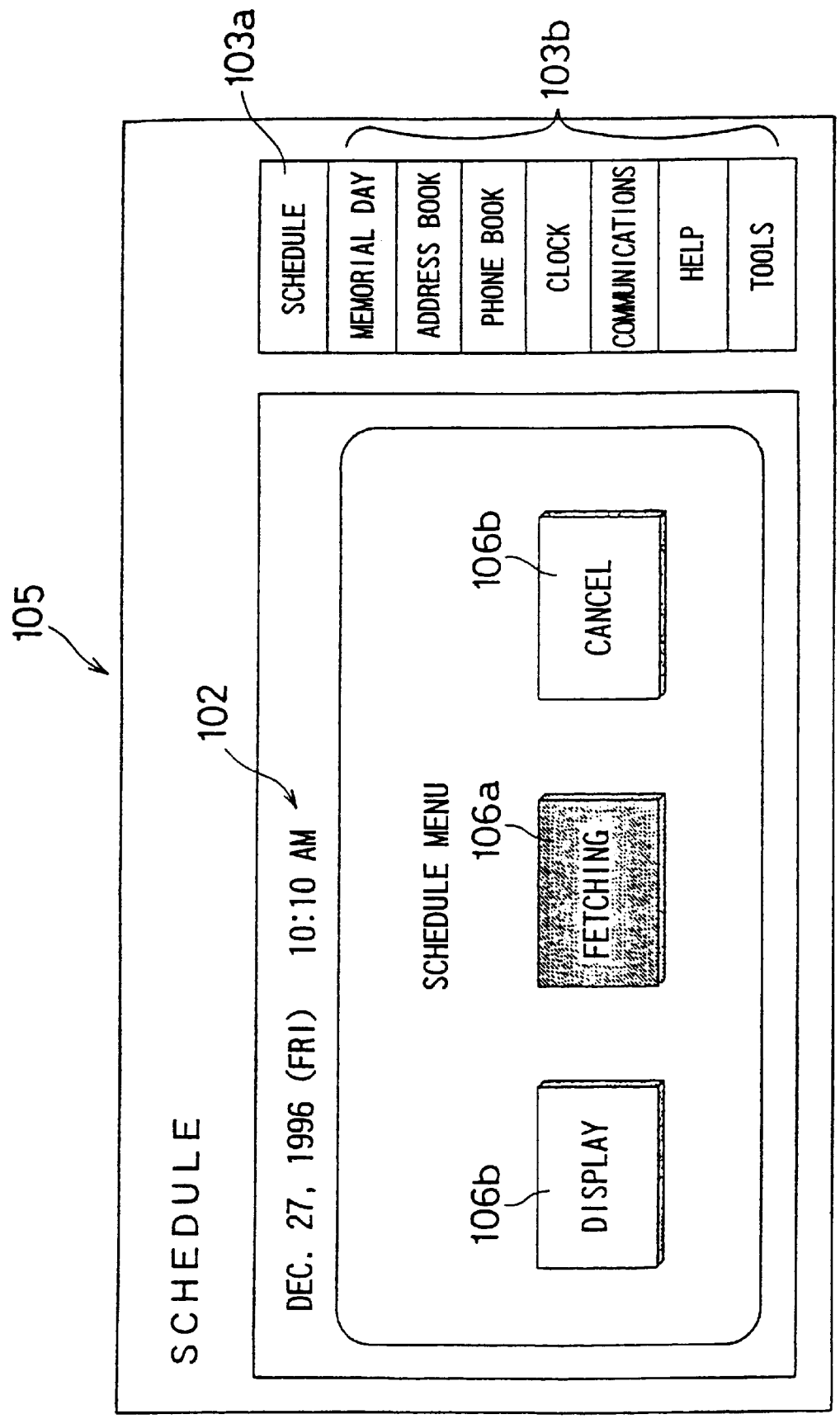
FIG. 6 illustrates a menu screen 105 of the data processing apparatus 1.

The schedule management function displays a menu screen 105 as shown in FIG. 6 on the liquid crystal display unit 28 so that the user can select any of possible processings in the schedule management function. The menu screen 105 are provided with a plurality of buttons including a button 106a used to select a voice processing and buttons 106b used to start another processing than the voice processing, so that the user can select any of the processings executable by the schedule management function. Another processing may be any one as long as it is related to the schedule management function. For example, there is a processing for displaying visually schedule data stored in the schedule memory 70. When selecting a voice processing, the user presses the button 106a. Consequently, the central controller 14 executes the main control program for the first voice processing.

Figure 7:
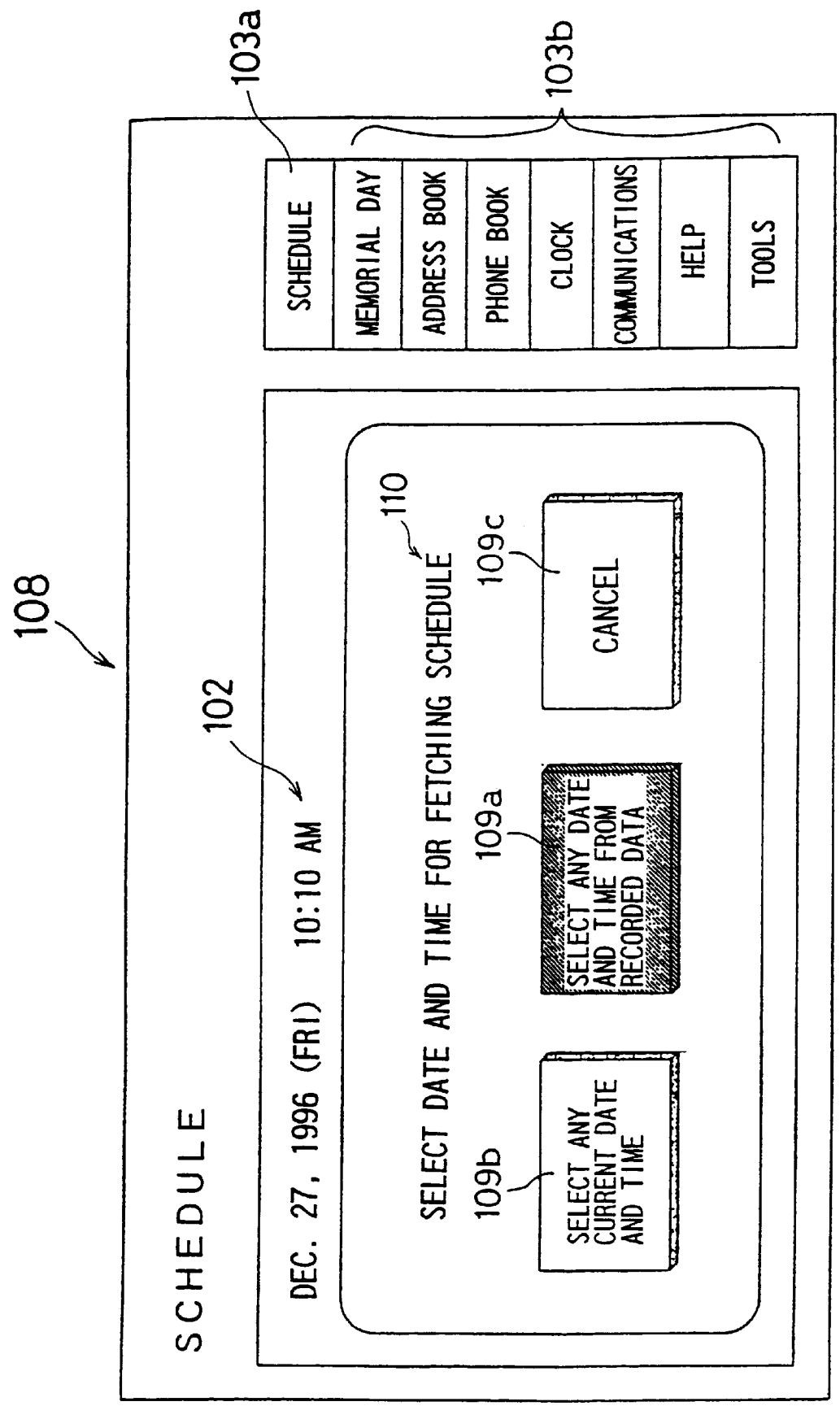
FIG. 7 illustrates a date and time selecting screen 108 of the data processing apparatus 1.

When the main control program for such a voice processing is to be executed, a date and time selecting screen 108 shown in FIG. 7 is displayed on the liquid crystal display unit 28 so that the user can select a date and time type. The date and time selecting screen 108 includes a plurality of buttons for selecting date and time; a button 109a used to select the date and time to be detected from a voice, a button 109b used to select the current date and time clocked by the clocking unit 13, and a button 109c used to select another processing. Another processing may be any one as long as it is related to date and time selecting operations. When selecting the date and time to be detected from a voice, the user presses the button 109a.

Figure 8:
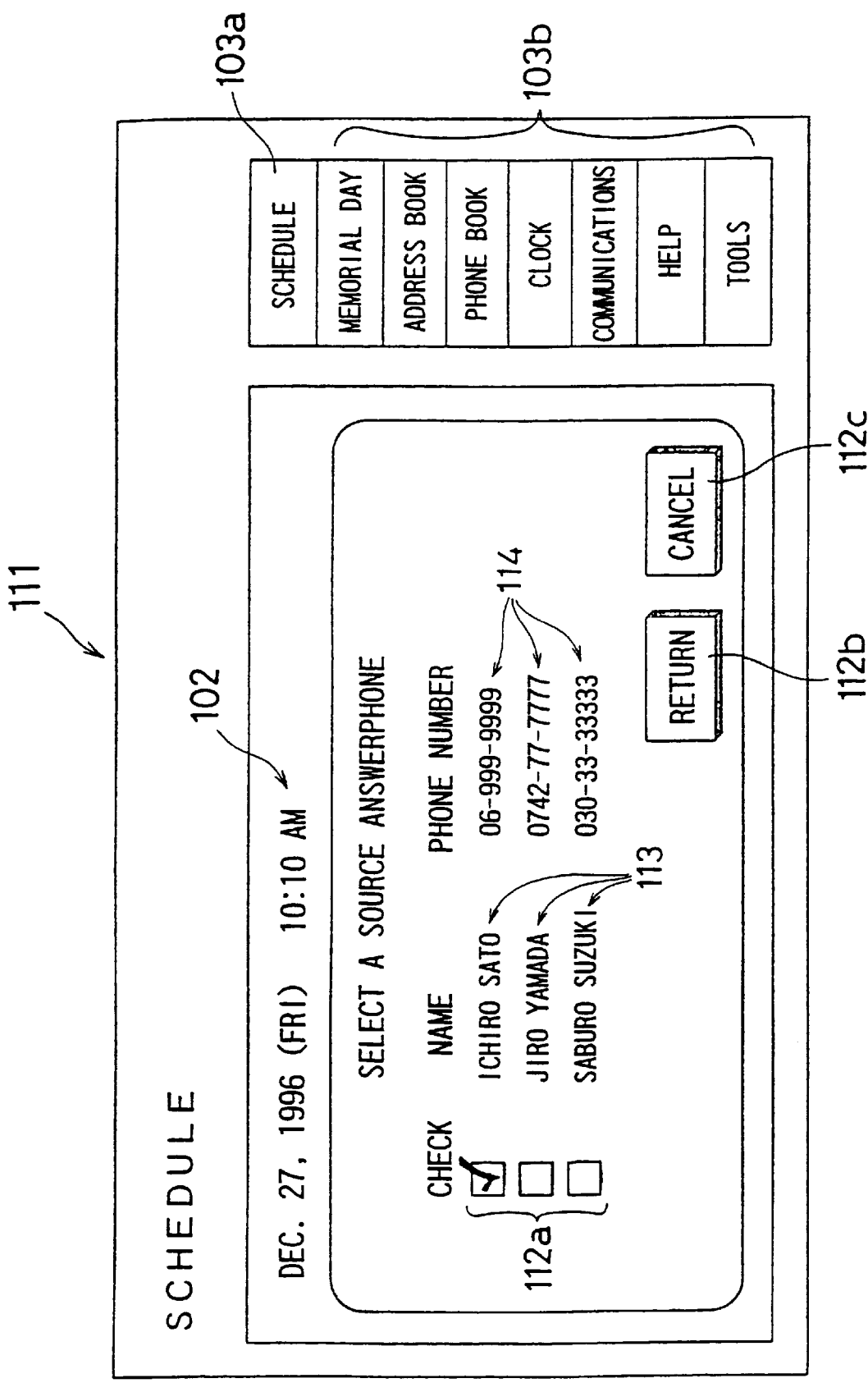
FIG. 8 illustrates a data source selecting screen 111 of the data processing apparatus 1.

Next, a data source selecting screen 111 shown in FIG. 8 is displayed on the liquid crystal display unit 28 prompting the user to select an automatic phone-answering machine from which a voice is to be fetched. The data source selecting screen 111 is provided with a plurality of buttons 112a used to select an automatic phone-answering machine. Those buttons 112a are accompanied by the names 113 of the owners of the automatic phone-answering machines from which voices may be fetched and numbers 114 of the automatic phone-answering machines displayed on the screen. On the screen shown in FIG. 8, the owners' names 113 and the numbers 114 of the automatic phone-answering machines, as well as the buttons 112a corresponding to the automatic phone-answering machines are disposed in rows and listed in parallel. The data source selecting screen 111 is further provided with a return button 112b used to stop a automatic phone-answering machine selection and return to the date and time selection screen, as well as a cancel button 112c used to stop a voice processing and return to the menu screen 105. In addition to those buttons, more buttons may be included to specify other processings related to the data source selecting processing. The user presses one of the buttons 112a disposed together with the name of the owner and the number of the desired automatic phone-answering machine as fetching source.

Figure 9:
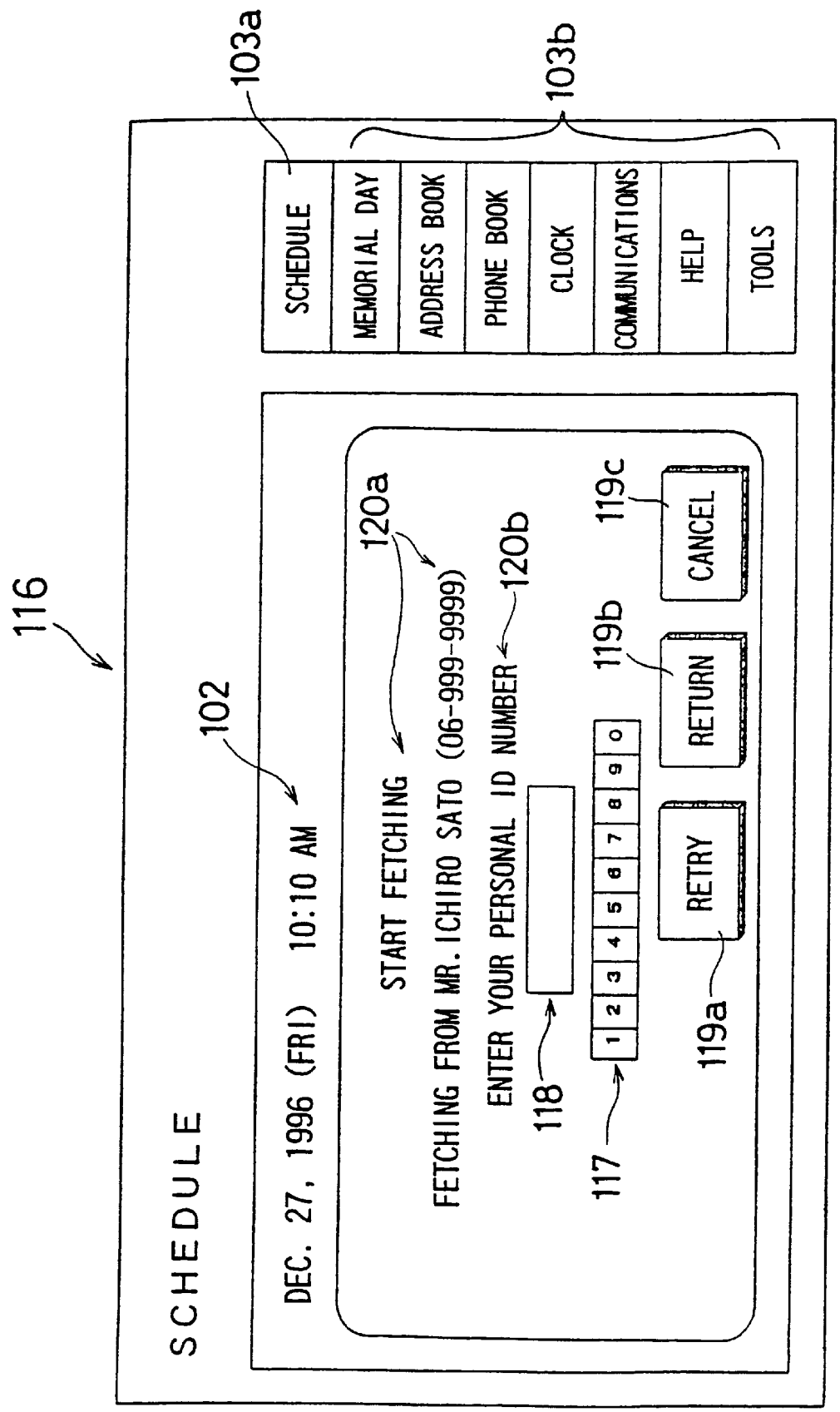
FIG. 9 illustrates a personal identification number input screen 116 of the data processing apparatus 1.

Next, a personal identification number input screen 116 shown in FIG. 9 is displayed on the liquid crystal display unit 28 prompting the user to enter the personal identification number. The automatic phone-answering machine uses this personal identification number to judge whether to enable or disable fetching of a voice from the automatic phone-answering machine decided as a source of voice. The personal identification number is decided for each automatic phone-answering machine. The personal identification number input screen 116 displays a message 120a indicating the owner's name and the number of the selected automatic phone-answering machine, a plurality of buttons 117 corresponding to each of the numbers used to enter numerals, and a field 118 for displaying an entered value. The screen also includes more buttons 119a, 119b, and 119c. The retry button 119a is used to retry a numeral input, the return button 119b is used to stop a personal identification number entry and return to an automatic phone-answering machine selection, and the cancel button 119c is used to stop a personal identification number entry and return to the menu screen 105. In addition to those buttons, more buttons may be included for specifying other processings related to a personal identification number entry. The user presses any of the buttons 117 and enters the personal identification number of the selected automatic phone-answering machine from which a voice is to be fetched.

Figure 10:
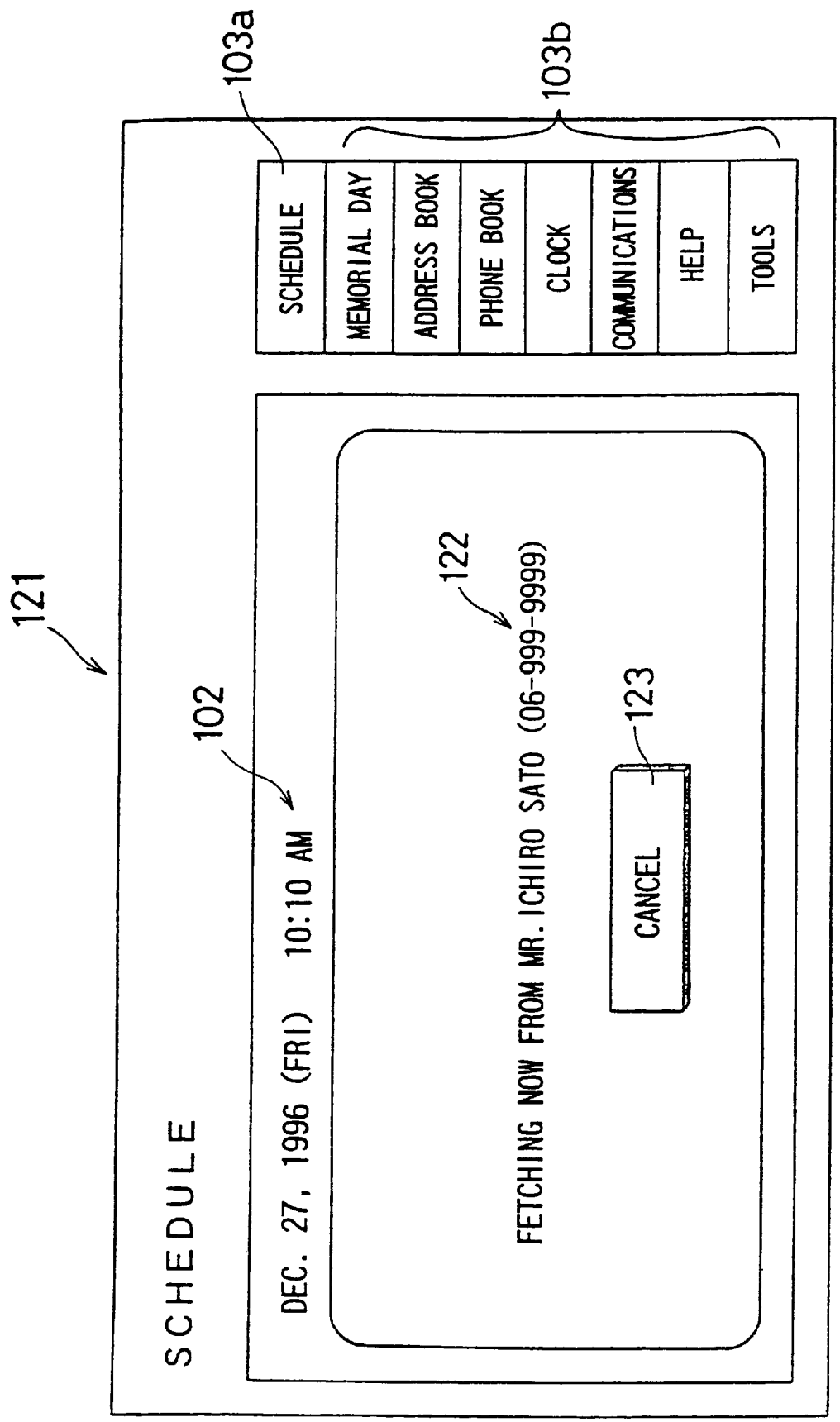
FIG. 10 illustrates a fetching now screen 121 of the data processing apparatus 1.

Consequently, the central controller 14 begins fetching of a voice. In this processing, a voice stored in the object automatic phone-answering machine is fetched and converted to a character string, then the date and time are detected from the character string. During this voice fetching, the liquid crystal display unit 28 displays the "fetching now" screen 121 shown in FIG. 10. The "fetching now" screen 121 displays a message 122 indicating the owner's name and the number of the connected automatic phone-answering machine and a cancel button 123 used to stop the voice fetching and return to the menu screen 105. The user can press the cancel button 123 only when he/she must stop a voice fetching due to a trouble. When no trouble is detected, the user waits until the voice fetching is ended.

Figure 11:
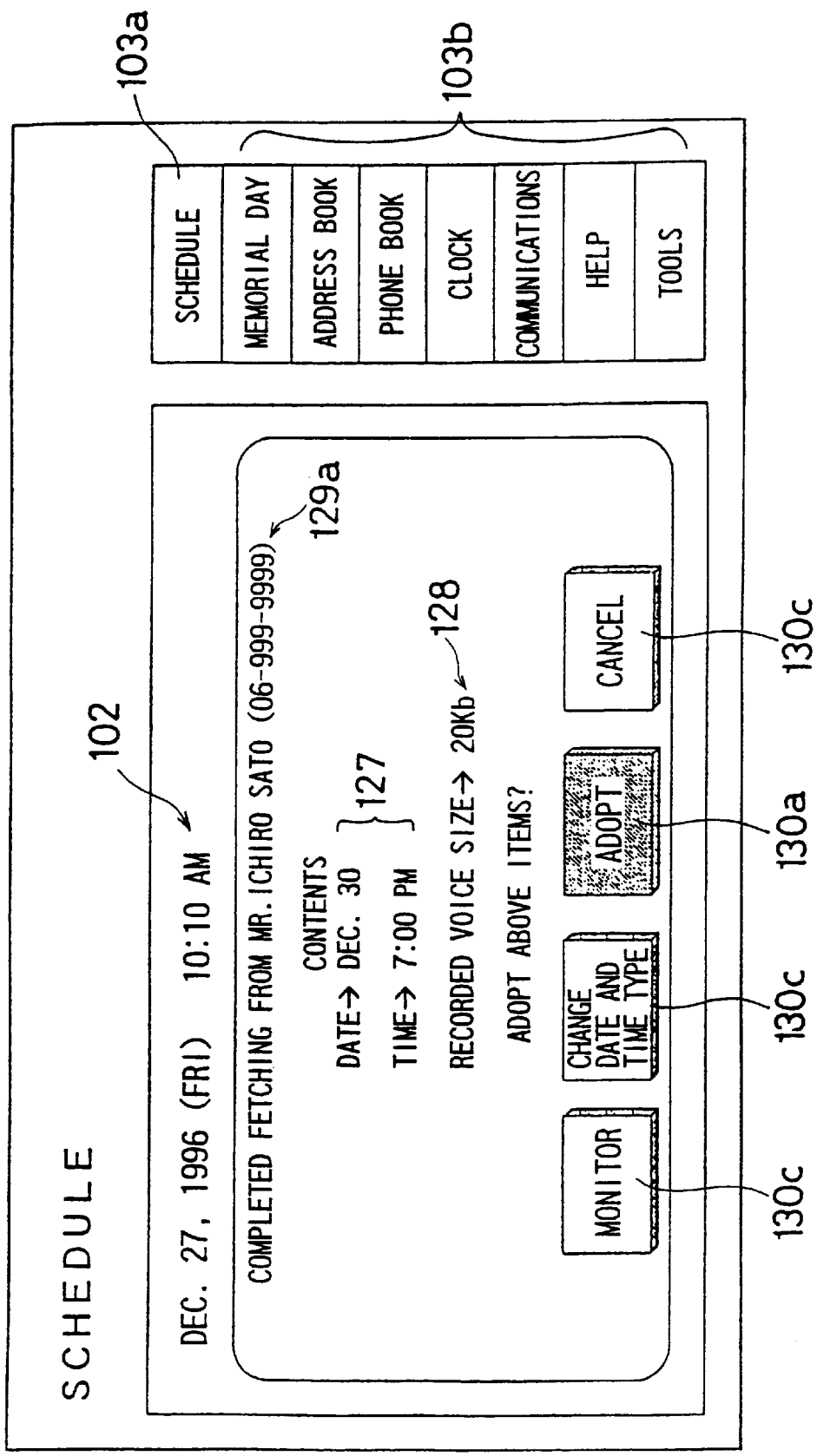
FIG. 11 illustrates a fetching completion screen 126 of the data processing apparatus 1.

After a voice fetching is ended, the central controller 14 displays a fetching completion screen 126 shown in FIG. 11 on the liquid crystal display unit 28. The fetching completion screen 126 displays the owner's name and the number of the selected automatic phone-answering machine, as well as a message 129a indicating an end of voice fetching and a message 127 indicating the detected date and time, and a message 128 indicating how much voice signal data is fetched. The fetching completion screen 126 also displays a plurality of buttons 130a and 130c prompting the user to select whether to adopt the fetched voice, the character string, as well as the date and time as schedule data. The button 130a is used to select adoption of the fetched date and time, the voice, and the character string and the button 130c is used to select another processing. Another processing may be any one as long as it is related to selection of whether to adopt fetched data. The user can judge whether to adopt fetched data by checking the date and time with reference to the message 127. When decided to adopt the fetched data (date and time, voice, and character string), the user presses the button 130a. Consequently, the central controller 14 stores the voice, the character string, and the date and time as schedule data in the schedule memory 70.

Figure 12:
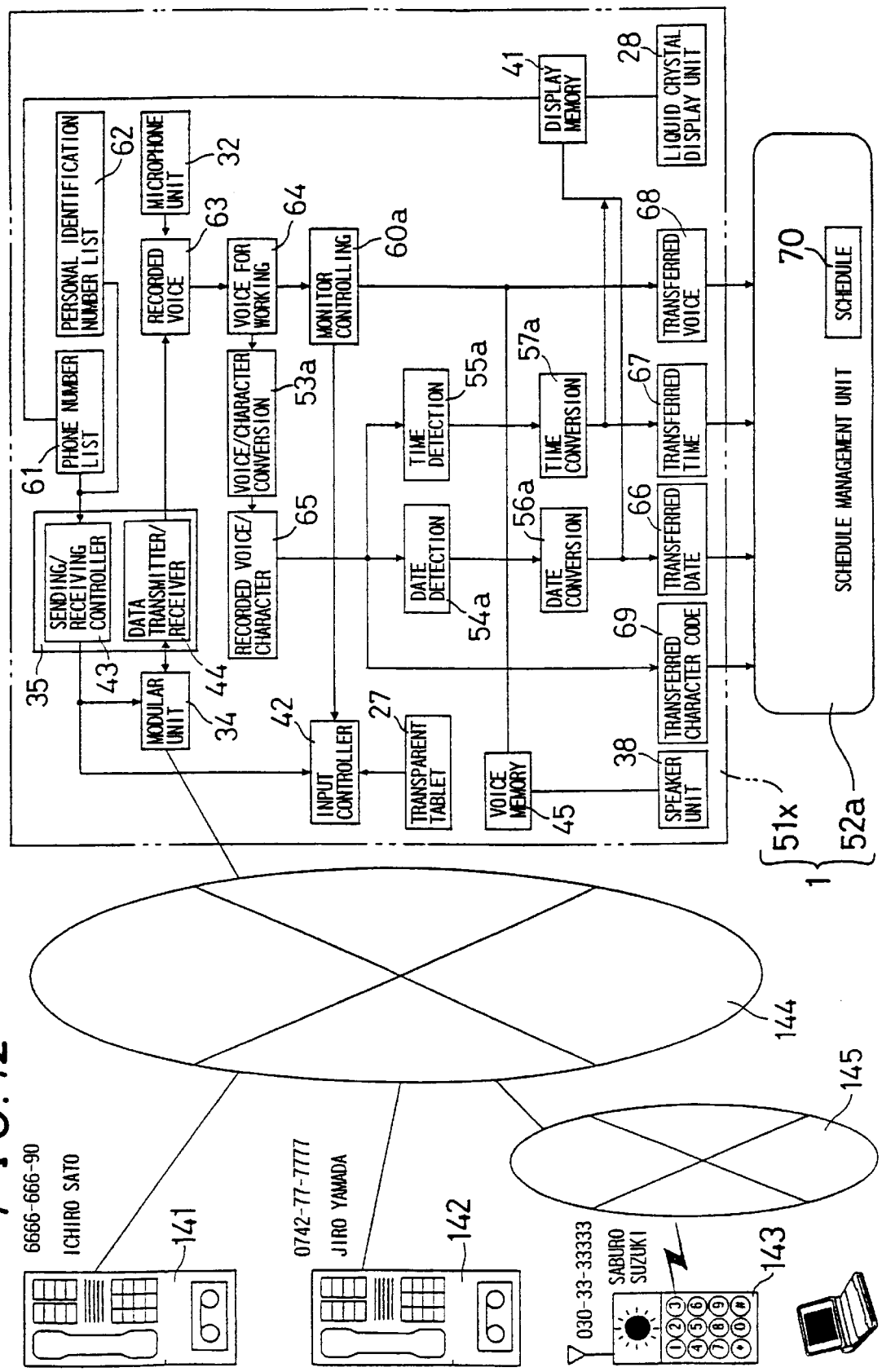
Figure 13:
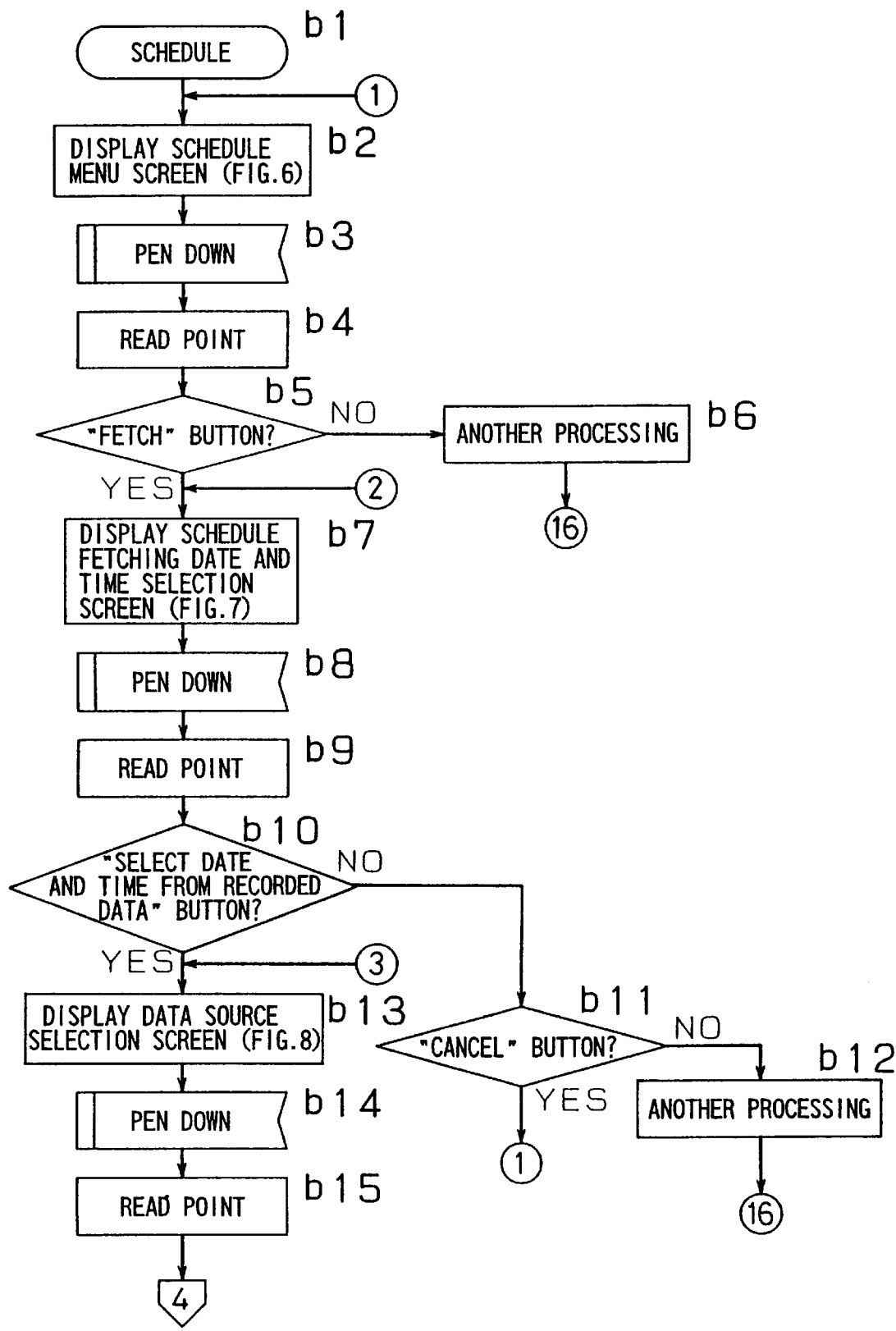
FIG. 13 is a flow chart describing a schedule management function including the first voice processing.
Figure 14:
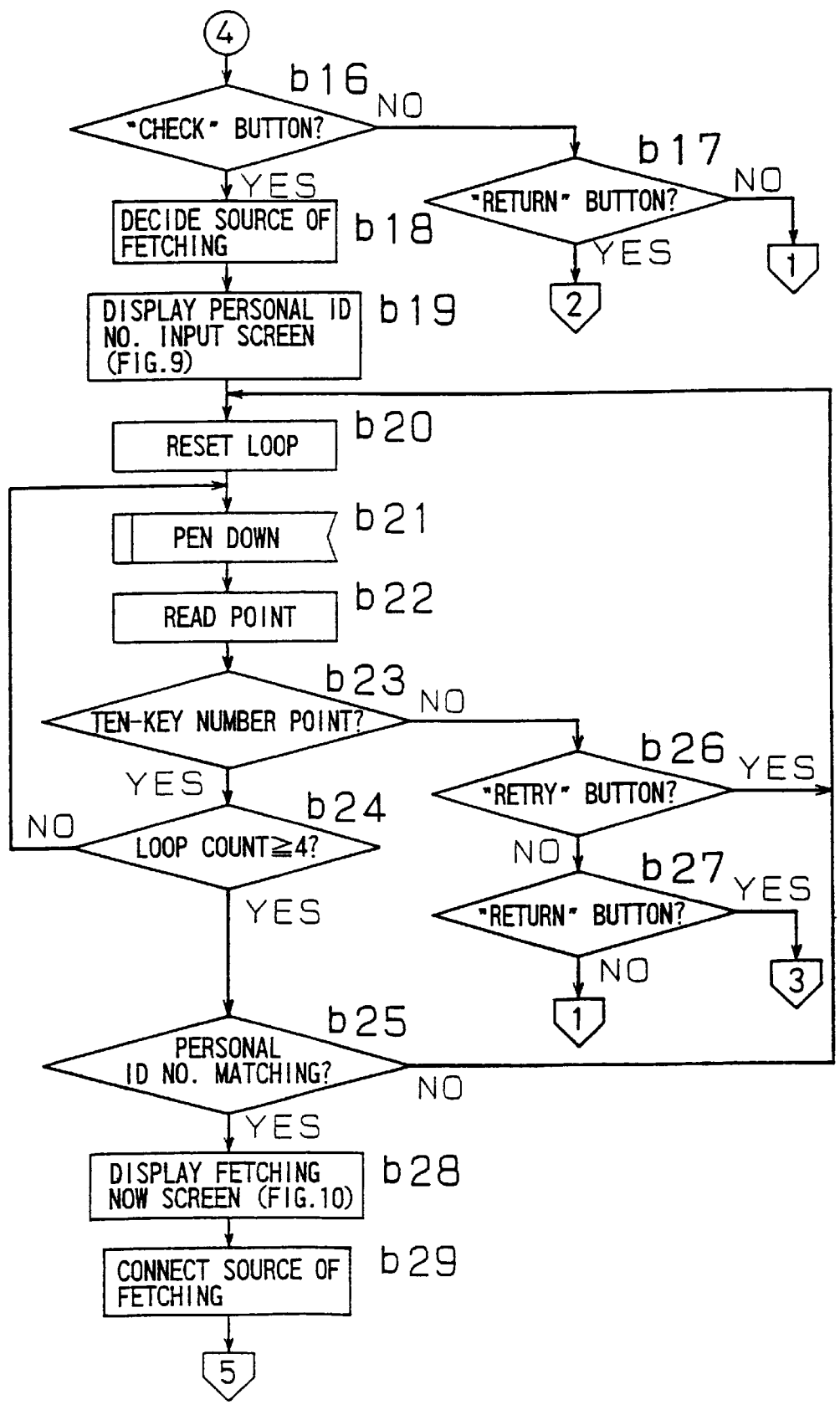
FIG. 14 is a flow chart describing the schedule management function including the first voice processing.
Figure 15:
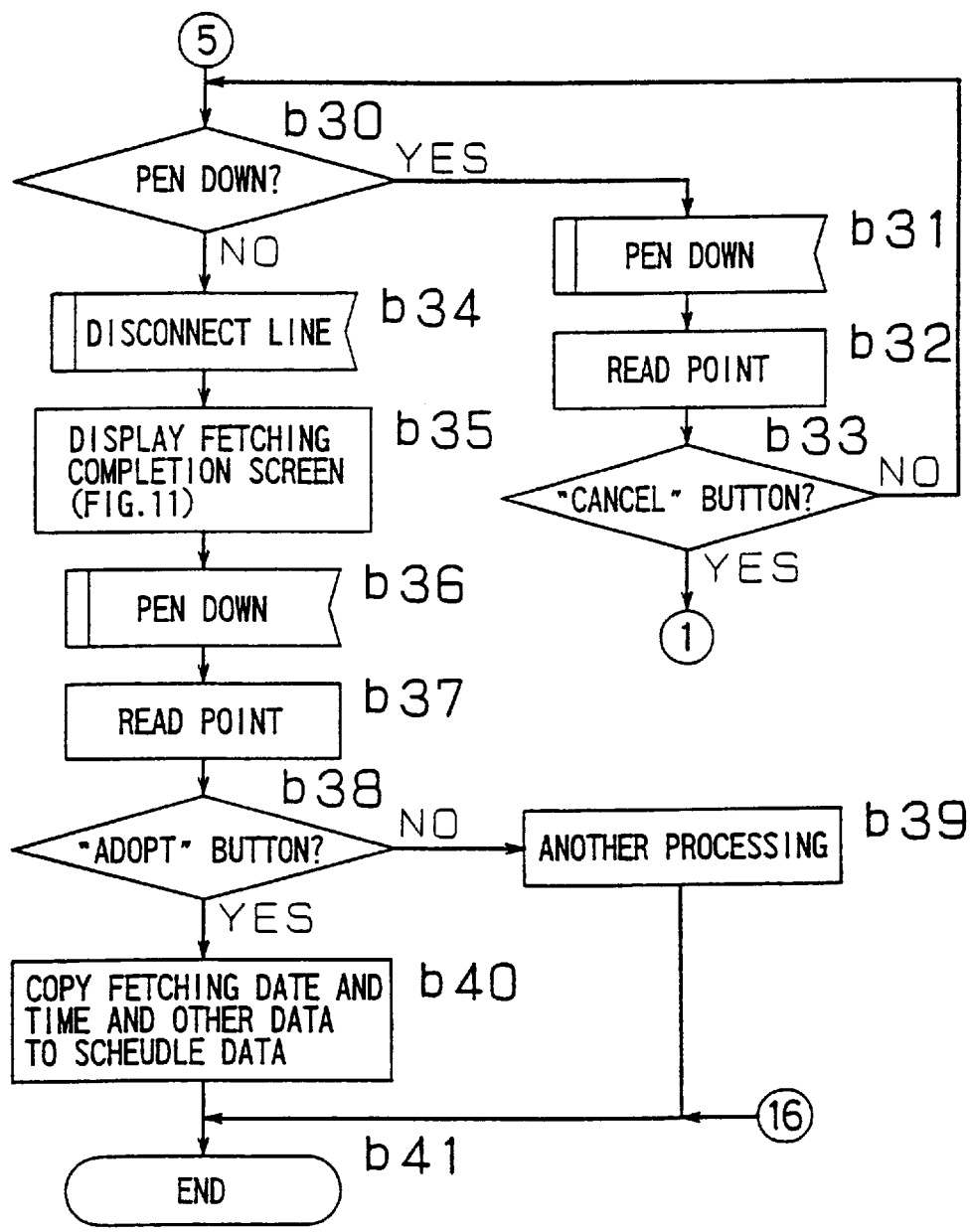
FIG. 15 is a flow chart describing the schedule management function including the first voice processing.

FIG. 12 is a block diagram for a functional configuration of the data processing apparatus 1 when the apparatus 1 functions both as the first voice processing apparatus 51x and as the schedule management unit 52a. FIGS. 13 to 15 are flow charts indicating the schedule management function including the first voice processing. In this block diagram indicating the functional configuration of the data processing apparatus 1 in this specification, no description will be made for a temporary signal memory used when signals are processed in each component, that is, a memory of one byte or so in capacity, for example, a loop counter. It is also premised that signals can be stored in the register in each component temporarily. Detailed description of such a temporary storing is thus omitted. If the schedule management function is selected as shown in the flow chart in FIG. 5 and the schedule management function program shown in any of FIGS. 13 to 15 is executed, the data processing apparatus 1 is composed of the first voice processing apparatus 51x and the schedule management unit 52a functionally and the first voice processing apparatus 51x is used as input device of the schedule management unit 52a.

Hereunder, a voice processing included in the schedule management function will be described in detail with reference to FIGS. 12 to 15. If the processing in step a5 in the flow chart shown in FIG. 5 is executed, the central controller 14 goes to step b2 from step b1. In steps b2 to b6, the central controller 14 functions as processing selecting circuit of the schedule management unit 52a for selecting various processings included in the schedule management function. Consequently, the central controller 14 stores a screen signal representing the menu screen 105 in the display memory 41 in step b2, then displays the menu screen 105 on the liquid crystal display unit 28 via the liquid crystal circuit unit 23. Hereunder, it is premised unless otherwise described specially that the method for displaying various screens on the liquid crystal display unit 28 is the same as that in step b2 except that only the screen signal to be processed is changed. Then, a pen-down operation is executed in step b3 and the point is read in step b4.

Next, in step b5, the central controller 14 references to the coordinates read in step b4 to judge whether or not the button 106a is pressed to select a voice processing. When judged NO, it means that the button 106b is pressed. Thus, the central controller 14 goes to step b6 from step b5, where the central controller 14 executes a processing corresponding to the button 106b, then exits the processing in the schedule management function in step b41. When judged YES, the central controller 14 goes to step b7 from step b5. The data processing apparatus 1 functions as the first voice processing apparatus 51x in the subsequent processings.

In steps b7 to b12, the central controller 14 functions as date and time selecting circuit for selecting any of the plural predetermined dates and times. Different date and time are decided by different criterion and method. In this embodiment, therefore, it is premised that there are two date and time data. Consequently, the central controller 14 displays the date and time selecting screen 108 on the liquid crystal display unit 28 in step b7. Then, the central controller 14 instructs the input/output unit to move a pen down in step b8 and reads the point in step b9. Then, in step b10, the central controller 14 references to the coordinates read in step b9 to judge whether or not the button 109a is pressed to select the detected date and time from the voice. When judged NO, the central controller 14 goes to step b11 from step b10, then the central controller 14 references to the coordinates read in step b9 to judge whether or not the cancel button 109c is pressed. When judged YES, the central controller 14 returns to step b2 from step b11. When judged NO, it means that the button 109b is pressed. Thus, the central controller 14 goes to step b12 from step b11. Then, the central controller 14 executes another processing corresponding to the button 109b and exits the processings in the flow chart in step b41. When the button 109a is pressed, the central controller 14 goes to step b13 from step b10.

In steps b13 to b17, the central controller 14 functions as fetching source selecting circuit for selecting an object voice source from a plurality of predetermined candidates for fetching source. Consequently, the central controller 14 reads the numbers and the owners' names of the automatic phone-answering machines which are a plurality of fetching source candidate automatic phone-answering machines 141 to 143, from a telephone number list memory 61 in step b13 and creates a screen signal representing the source selecting screen 111 according to the read data and stores the created screen signal in the display memory 41. The telephone number list memory 61 stores numbers and owners' names of automatic phone-answering machines, which are corresponded to each other, for example, in a list form beforehand. The liquid crystal circuit unit 23 displays the source selecting screen 111 on the liquid crystal display unit 28 according to the screen signal. In addition, a pen-down operation is executed in step b14 and a point reading operation is executed in step b15.

In step b16, the central controller 14 references to the coordinates read in step b14 and judges whether or not any of the buttons 112a corresponding to the automatic phone-answering machine number and the owner's name of the automatic phone-answering machine is pressed. When judged NO, the central controller 14 goes to step b17 from step b16, where the central controller 14 references to the coordinates read in step b14 to judge whether or not the return button 112b is pressed. When judged YES, the central controller 14 goes back to step b6 from step b17. When judged NO, it means that the cancel button 112c is pressed. Thus, the central controller 14 goes back to step b2 from step b11. If any of the buttons 112a is pressed, the central controller goes to step b18 from step b16. In step b18, the central controller 14 checks which one of the plural buttons 112a is pressed thereby to obtain the owner's name and the number of the automatic phone-answering machine corresponding to the pressed button from the telephone number list memory 61. Consequently, an automatic phone-answering machine from which a voice is fetched is decided.

In steps b19 to b27, the central controller 14 functions as personal identification numbers entering circuit for entering personal identification numbers. Consequently, the central controller 14 displays the personal identification number input screen 116 on the liquid crystal display unit 28 in step b19. The owner's name and the number of an automatic phone-answering machine displayed on this personal identification number input screen 116 is the one obtained in step b18. The plurality of buttons 117 on this screen 116 are equal to those of a so-called ten-key pad.

In step a20, the central controller 14 resets the loop processing performed in steps b21 to b24. Concretely, the counter for counting the number of this loop processings repeated is cleared to 0 which is initial value, and the value stored so as to be displayed in the field 118 is erased. The input/output unit is then instructed to move the pen down in step b21 and read the point in step b22. Furthermore, in step b23, the central controller 14 references to the coordinates read in step b22 to judge whether or not any one of the plurality of buttons 117 used to enter numerals is pressed. When judged YES, the central controller 14 judges the number (0 to 9) corresponding to the specified button 117, then fetches the corresponding number and displays it in the field 118. After this, the central controller 14 judges whether or not the number of loop processings repeated in step b24, that is, the current counter value is over the number of digits in the personal identification number. When judged NO (less than the number of digits), the controller 14 adds 1 to the counter value and returns to step b21. The loop processing is repeated as many as the number of digits in the personal identification number. Assuming that the earlier the value is entered in each loop processing, the higher the decimal place becomes, the numerals are displayed in the field 118 in order they are entered. In this embodiment, it is assumed that the number of digits is 4. If the number of loop processings repeated is over the number of digits (4), the central controller 14 goes to step b25 from step b24.

In step b25, the central controller 14 reads the personal identification number corresponding to the number and owner's name of the automatic phone-answering machine fetched in step b18 from the personal identification number list memory 62. The personal identification number is stored in the personal identification number list memory 62 in a list form beforehand so that it is corresponded to each of the numbers and owners' names of automatic phone-answering machines stored in the telephone number list memory 61. It is assumed that this personal identification number is a string consisting of a plurality of numerals. Then, the central controller 14 judges whether or not the read personal identification number matches with the string of plural numerals entered in a loop processing and displayed in the field 118. When judged YES, the current user of the data processing apparatus 1 is enabled to fetch the voice signals from the automatic phone-answering machine decided as a voice source in step b18. Thus, the central controller 14 moves to step b28 from step b25. When judged NO, the central controller 14 returns to step b20 from step b25 regarding the entered value not to be the object personal identification number and prompts the user to retry the personal identification number entry.

When the button 117 is not pressed, the central controller moves to step b26 from step b23 and references to the coordinates read in step b22 thereby to judge whether or not the retry button 119a is pressed. When judged YES, the controller 14 returns to step b20 from step b26. When judged NO, the controller 14 moves to step b27 from step b26 and references to the coordinates read in step b22 to judge whether or not the return button 119b is pressed. When judged YES, the controller returns to step b13 from step b27. When judged NO, it means that the cancel button 119c is pressed. Thus, the controller returns to step b2 from step b27.

In steps b28 to b33, the central controller 14 fetches a voice from a selected automatic phone-answering machine. Consequently, the controller 14 displays the "fetching now" screen 121 on the liquid crystal display unit 28 in step b28 at first. The owners' names and numbers of automatic phone-answering machines displayed on this screen 121 are the same as those obtained in step b18. Then, the central controller 14 begins fetching of a voice from the automatic phone-answering machine decided as a source of the voice in step b18 via a modem unit 31 in step b29.

Concretely, the processing for fetching a voice from an automatic phone-answering machine is executed as follows. It is premised that the modular unit 34 is connected electrically to a public line network 144 beforehand. At first, the sending/receiving controller 43 reads the number of the automatic phone-answering machine from the telephone number list memory 61 and connects a telephone line using the telephone number. Consequently, the line is connected between the automatic phone-answering machine and the data processing apparatus 1 via the public line network 144. If the automatic phone-answering machine is a portable telephone in this case, the line is connected via the public line network 144 and a portable telephone network 145. Then, the sending/receiving controller 43 sends and receives various control signals to and from the automatic phone-answering machine via the public line network and the modular unit 34. The personal identification number described above is also included in these control signals. Consequently, the voice stored in the automatic phone-answering machine is reproduced and the reproduced voice is transmitted to the modular controller 35 via the public line network and the modular unit 34, then received by the data transmitter/receiver 44. This data transmitter and receiver unit 44 stores the received voice in the recorded voice memory 63.

Along with this voice fetching processing, the central controller 14 instructs the input controller 42 to judge whether or not any point on the transparent tablet 27 is pressed in step b30. When pressed, the controller 14 instructs the input/output unit to move a pen down in step b31 and read the point in step b32. Then, in step b33, the controller 14 references to the coordinates read in step b32 and judges whether or not the cancel button 123 is pressed. When judged YES, the controller 14 judges that it is specified to stop voice fetching and instructs the sending/receiving controller 43 to disconnect the line. After the line is disconnected, the controller 14 returns to step b2 from step b33. When judged NO, the controller 14 judges that it is not specified to stop the voice fetching and returns to step b30 from step 33 with no operation. If it is judged by the input controller 42 that no point is pressed on the transparent tablet 27 until all the voices stored in the automatic phone-answering machine are received by the data transmitter and receiver 44 after the line is connected, the controller 14 moves to step b34 from step b30.

In step b34, the sending/receiving controller 43 disconnects the line. Consequently, the line between the automatic phone-answering machine and the data processing apparatus 1 is disconnected and the voice fetching is ended. After this, the data transmitter/receiver 44 transfers the voice stored in the recorded voice memory 63 into the voice memory for working 64.

Then, the central controller 14 reads the sub-control program of the voice/character code conversion 53 from the memory 16 and executes the program to function as voice/character code converting circuit 53a. The voice/character converting circuit 53a converts a voice stored in the voice memory for working 64 to a character string and stores the character string in the recorded voice/character code memory. Concretely, this conversion is performed as follows. At first, the frequency of a voice stored in the voice memory for working 64 is analyzed thereby to check the status of the voice spectrum analysis change, etc. Then, the analysis result is normalized with respect to the time axis thereby to absorb the variability caused by the change of the pronunciation speed. Furthermore, syllables and vocal sounds are extracted from the analysis result after the normalization. The extraction result is then collated with data of syllables and vocal sounds of a prepared word thereby to recognize the pronounced word with the voice. The character string representing the word recognized such way is outputted as a character string, which is a result of the voice conversion result.

After this, the central controller 14 reads the subcontrol program of the date detection 54 from the memory 16 and executes the program to function as date detecting circuit 54a. The date detecting circuit 54a detects the date part from the character string stored in the recorded voice/character code memory 65. This detection is performed, for example, as follows; at first, date words are prepared as reference words beforehand and it is checked whether or not the reference words match with part of the character string by changing part of the character string continuously, thereby the matched part is detected.

Next, the central controller 14 reads the sub-control program of the date conversion 56 from the memory 16 and executes the program to function as date converting circuit 56a. The date converting circuit 56a converts the date part detected by the date detecting circuit 54a to predetermined date words corresponding to the date part. The word consists of one or more characters. The date represented by the date words is stored in the display memory 41 and in the transferred date memory 66 respectively. The reason why this conversion is made, as well as the effect of the conversion are as follows.

When a date is to be given orally, the date is not represented by only numbers. For example, when a date is the first day in a certain month, the detected date part is "tsuitachi". Since it is preferable that the date is represented by only numbers, the date part is converted to "1" in this case. Consequently, a date may be searched easily.

After this, the central controller 14 reads the sub-control program of the time detection 55 from the memory 16 and executes the program to function as time detecting circuit 55a. The time detecting circuit 55a detects time part of the character string stored in the recorded voice/character code memory 65. This detecting method is the same as the date detecting method except that the reference word is a time related word. The date detecting circuit 54a and the time detecting circuit 55a are combined to compose date and time detecting circuit for detecting date and time part of the character string.

Then, the central controller 14 reads the sub-control program of the time conversion 57 from the memory 16 and executes the program to function as time converting circuit 57a. The time converting circuit 57a converts the time part detected by the time detecting circuit 55a to a predetermined time word corresponding to the detected time part. The time represented by the time word is stored in the display memory 41 and in the transferred time memory 67 respectively. The reason and effect of this conversion are the same as those of the date conversion described above. Furthermore, when a time is given orally, the time value is not given clearly in many cases; it may often be given like "10 minutes before six". The time converting circuit 57a converts, for example, "10 minutes before six" to "5' 50". The time is thus indicated clearly and it becomes more easy to sort and search. According to the date converting circuit 56a and the time converting circuit 57a, the part represented date and time is converted to a predetermined word corresponding to the object date and time. Thus, a notation standardizing circuit can be composed for standardizing date and time notation methods.

In steps b35 to b40, the central controller 14 functions as output controlling circuit for associating date and time with a voice and a character string as attribute data, then outputting all of the above items as schedule data. The central controller 14 then checks the quantity of the voice data stored in the recorded voice memory 63 in step b35 and creates a screen signal for representing the fetching completion screen 126 according to the data quantity, as well as the date and time stored in the display memory 41 and stores the created screen signal in the display memory 41. The liquid crystal circuit unit 23 displays the fetching completion screen 126 on the liquid crystal display unit 28 according to the screen signal. Then, the controller 14 allows the pen to be moved down in step b36 and the point to be read in step b37.

In step b38, the central controller 14 references to the coordinates read in step b37 to judge whether or not the button 130a is pressed to select adoption of the voice, etc. as schedule data. When judged NO, it means that the button 130c is pressed. The controller 14 thus goes to step b39 from step b38 to perform another processing, then exits the processing of the schedule management function in step b41. When the button 130a is pressed, the controller 14 goes to step b40 from step b38.

In step b40, the central controller 14 reads the sub-control program of the monitor controlling 60 from the memory 16 and executes the program to function as monitor controlling circuit 60a. By the monitor controlling circuit 60a, the voice stored in the voice memory for working 64 is stored in the transferred voice memory 68 and the character string stored in the recorded voice/character code memory 65 is stored in the transferred character code memory 69. Each of the transferred date memory 66, the transferred time memory 67, the transferred voice memory 68, and the transferred character code memory 69 functions as an interface for transferring schedule data from the first voice processing apparatus 51x to the schedule management unit 52a. Then, the monitor controlling circuit 60a brings the transferred data and the date and time stored in the transferred date and time memories 66, 67 into a state where they can be outputted in the form of being associated as attribute data with the voice and character string stored in the transferred voice and character code memories 68, 69, respectively. This completes the processing of the first voice processing apparatus 51x. The monitor controlling circuit 60a may also store a voice in the voice memory 45 in step b39 as another processing and output the voice from the speaker unit 38. Consequently, the user can listen to the contents of the voice transmitted as a voice to confirm and decide whether to adopt the voice and the character string as schedule data.

After this, the central controller 14 executes the main control program of the schedule management function so as to function as schedule management unit 52a. This schedule management unit 52a is provided with a schedule memory 70. This schedule memory 70, for example, is a list type memory composed of a plurality of attribute areas for storing attribute data and a plurality of item areas for storing items classified by attribute data. Each attribute area and each item area are in one-to-one correspondence with the schedule memory 70. This attribute data is date and time data and the item areas are disposed in the order of, for example, date and time according to the attribute data stored in each corresponding attribute area. The schedule management unit 52a reads both date and time stored in the transferred date memory 66 and in the transferred time memory 67 and stores them in the date and time area regarding them as attribute data of schedule data. Furthermore, the schedule management unit 52a reads the voice and the character string stored in the transferred voice memory 68 and in the transferred character code memory 69 respectively and stores them in the item areas corresponding to the date and time area storing the date and time described above regarding them as items of schedule data. After the schedule data is outputted, the unit 52a exits the processing of the schedule management function in step b41.

According to the series of processings described above, the first voice processing apparatus 51x converts schedule data entered by voice to a character string automatically and outputs with date and time associated therewith as attribute data to the schedule management unit 52a. Consequently, the invention can prevent character string and date and time input errors caused by user's operations, which are often seen in the related art technologies. Furthermore, this date and time are obtained by detecting any date and time part from a voice, so that the user is not requested to enter any date and time to the data processing apparatus. Consequently, the user is freed from troublesome setting of attribute data, so that it makes easier to operate the data processing apparatus 1.

Although the first voice processing apparatus 51x fetches a voice as processing object from an automatic phone-answering machine using the modular controller 35 and the modular unit 34 as described above, the voice may be fetched using another method. For example, a voice entered by the user via a microphone unit 32 may be stored in the recorded voice memory 63 as the processing object voice. In such a case, the voice may be stored in the recorded voice memory 63 before the schedule management function is executed or the user may be prompted to enter the voice via the microphone unit 32 during a voice processing instead of deciding an automatic phone-answering machine and fetching the voice from the automatic phone-answering machine. If a voice of schedule data notified by a telephone while the user is absent and stored in an automatic phone-answering machine is to be fetched, the user is not requested to listen to the voice again in order to store it later in the schedule management unit 52a. Thus, it will be easier to enter schedule data to the schedule management unit 52a.

Figure 16:
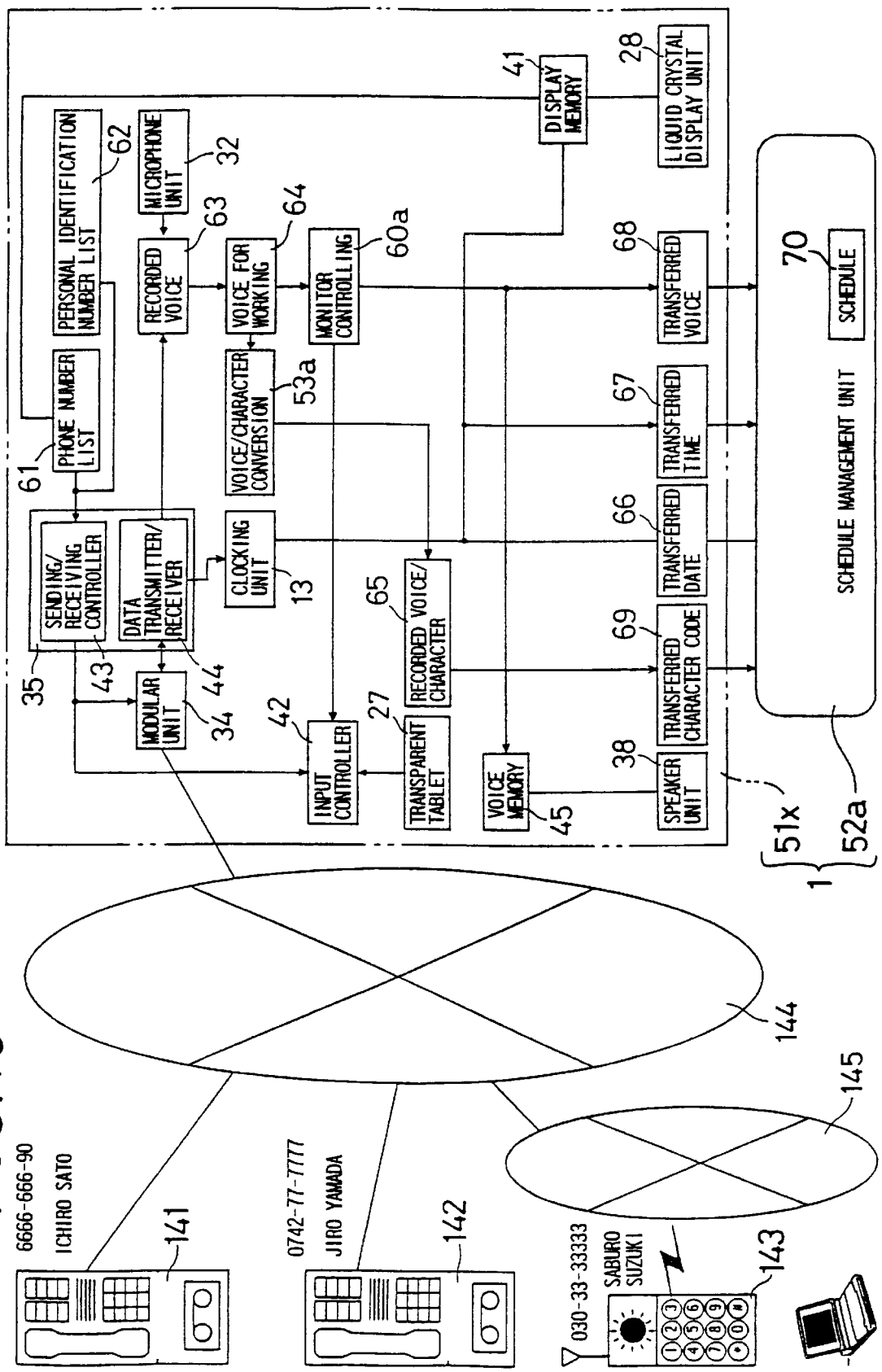
Figure 17:
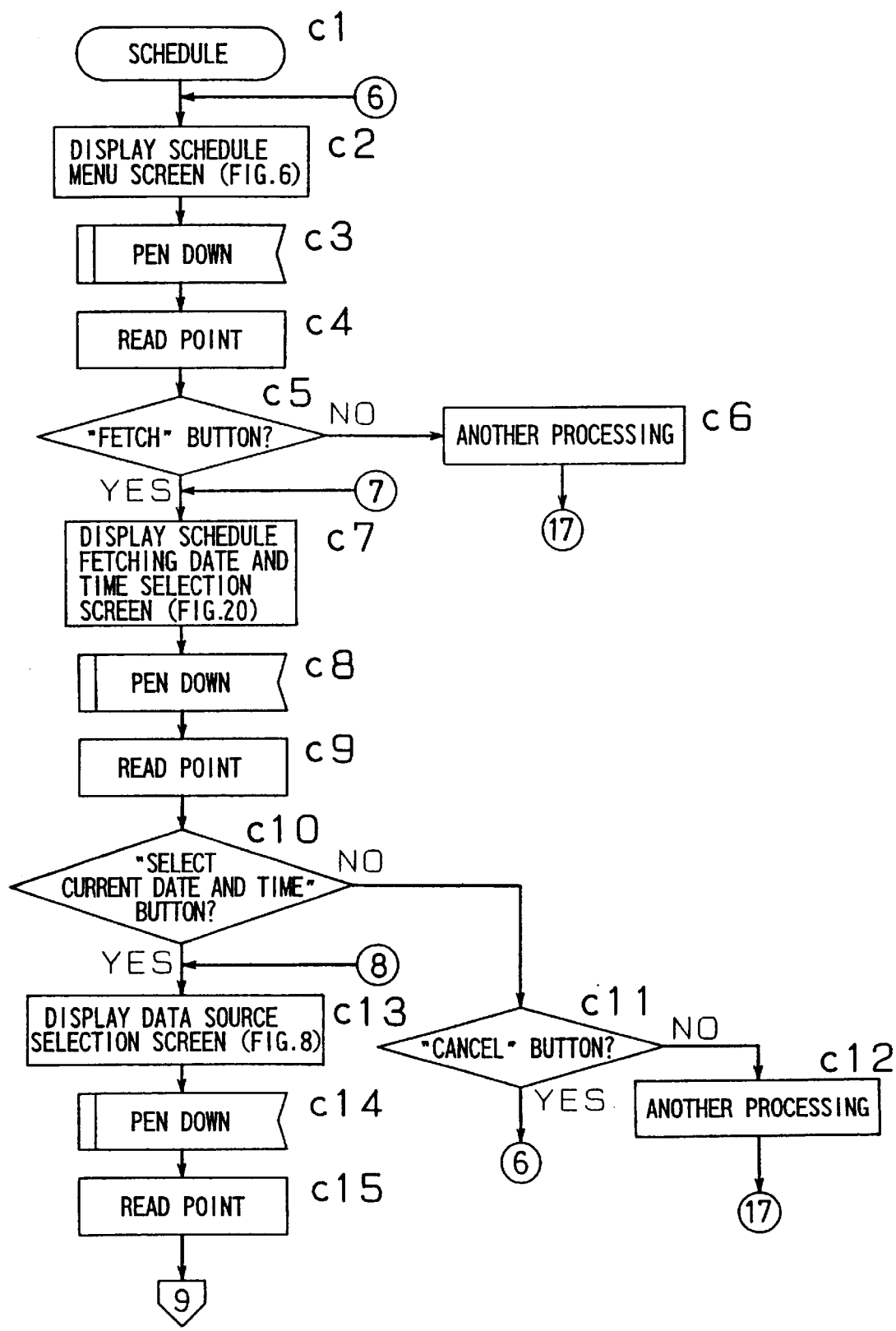
FIG. 17 is a flow chart describing the schedule management function including the second voice processing.
Figure 18:
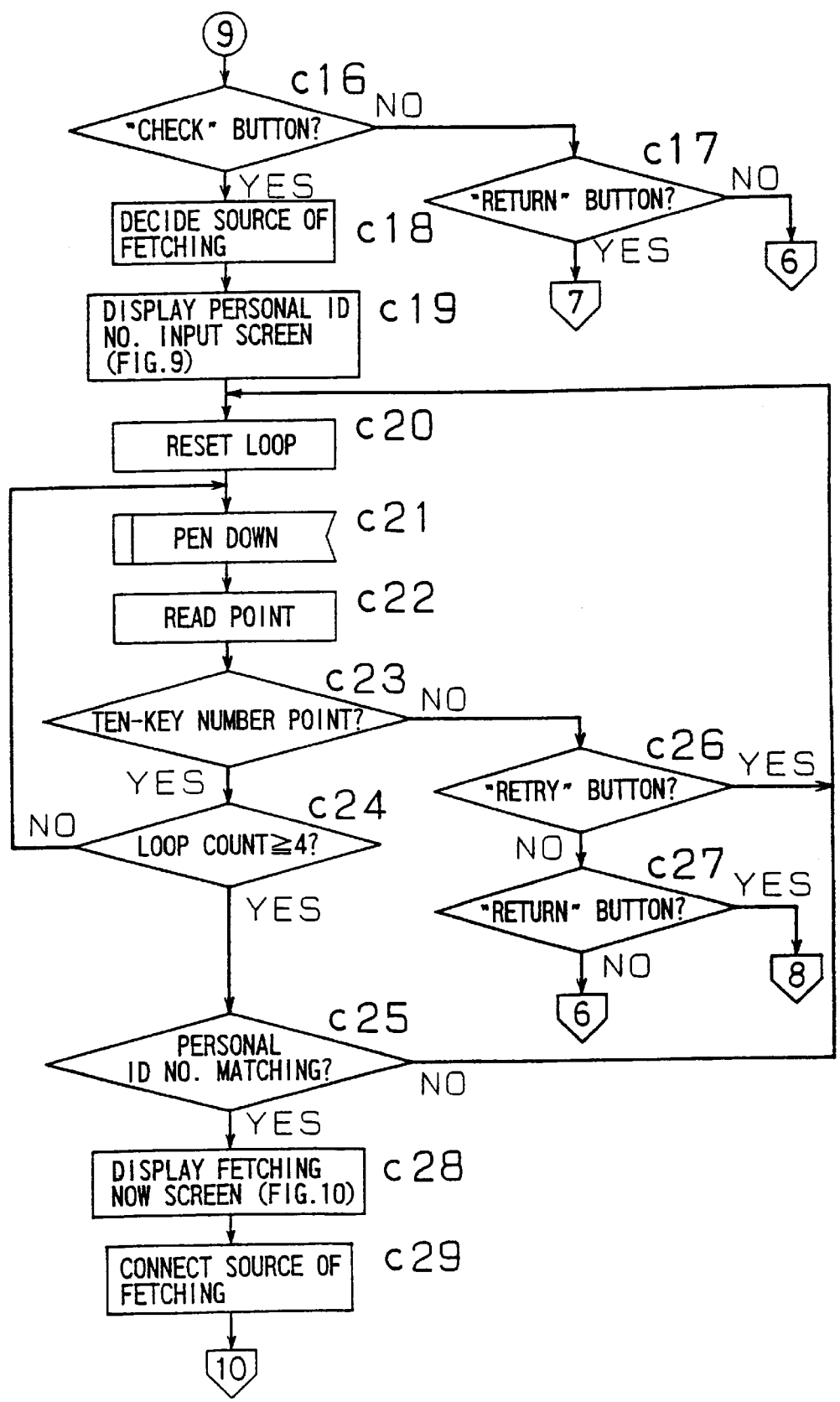
FIG. 18 is a flow chart describing the schedule management function including the second voice processing.
Figure 19:
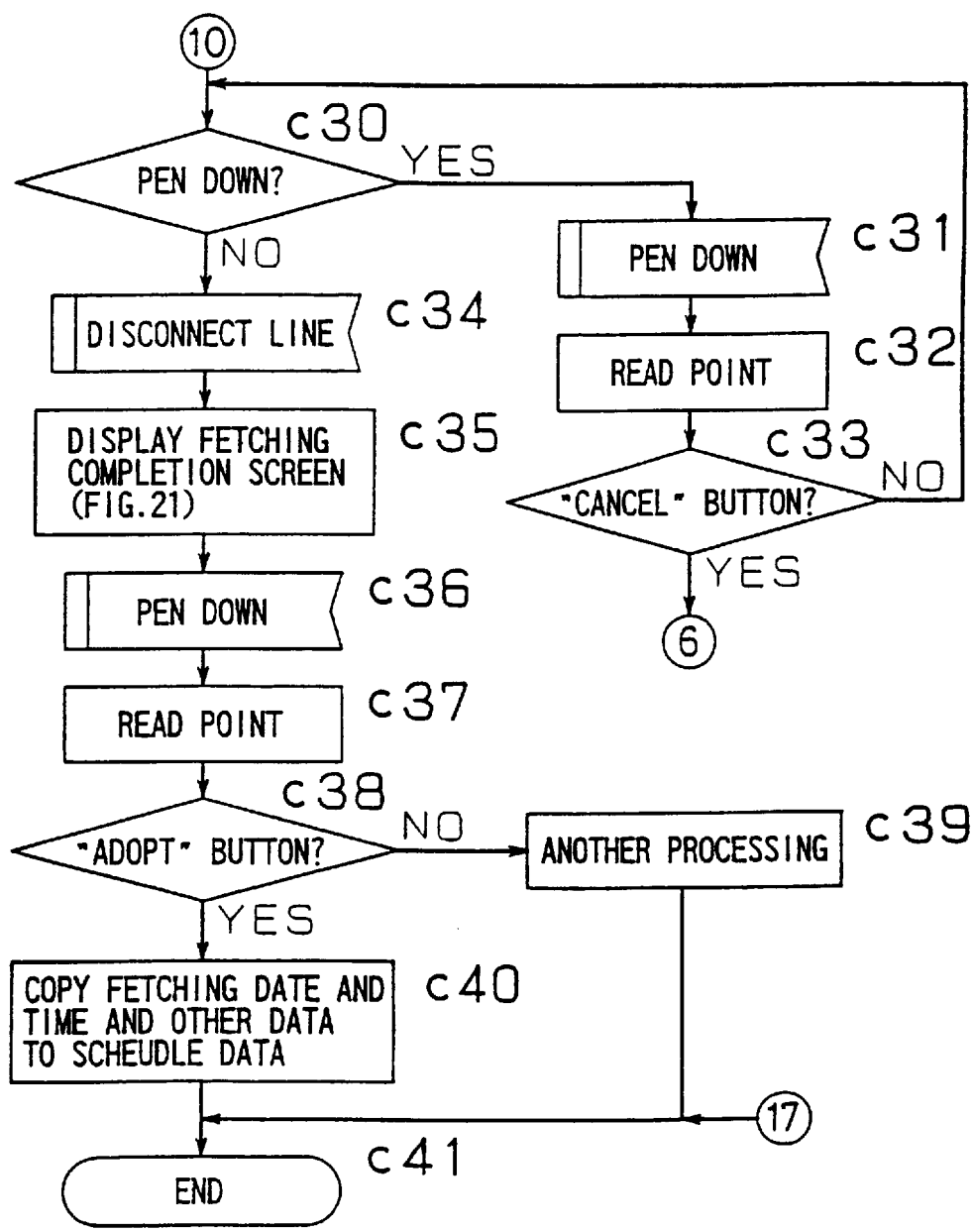
FIG. 19 is a flow chart describing the schedule management function including the second voice processing.

FIG. 16 is a block diagram for a functional configuration of the data processing apparatus 1, which functions as the second voice processing apparatus 51y and the schedule management unit 52a. FIGS. 17 to 19 are flow charts indicating the schedule management function including the second voice processing. If an execution of the schedule management function is selected in the flow chart shown in FIG. 5, the data processing apparatus 1 is functionally composed of the second voice processing apparatus 51y and the schedule management unit 52a when the schedule management function program shown in FIGS. 17 to 19 is executed. And, the second voice processing apparatus 51y is used as input device of the schedule management unit 52a. The functional configuration in such a case is the same as the functional configuration of the case shown in FIG. 12 except that a clocking unit 13 is provided instead of the date detecting circuit 54a, the time detecting circuit 55a, the date converting circuit 56a, and the time converting circuit 57a, and the data transmitter/receiver unit 44 outputs signals to the clocking unit 13. The output of the clocking unit 13 is applied to the transferred date memory 66 and the transferred time memory 67. Hereunder, same numerals will be given to the same components in functional configuration, structure, and action as those shown in FIG. 12, avoiding redundant description.

Hereunder, the second voice processing included in the schedule management function will be described in detail with reference to FIGS. 16 to 19. The flow charts shown in FIGS. 17 to 19 include some steps in which the same processings as those shown in FIGS. 13 to 15 are performed. Thus, description of the processings in such the steps will be omitted here. When the processing in step a5 in the flow chart shown in FIG. 5 is executed, the central controller 14 goes to step c2 from step cl. The processings in steps c2 to c6 are equal to the processings in steps b2 to b6. In and after step c7, the data processing apparatus 1 functions as the second voice processing apparatus 51y.

Figure 20:
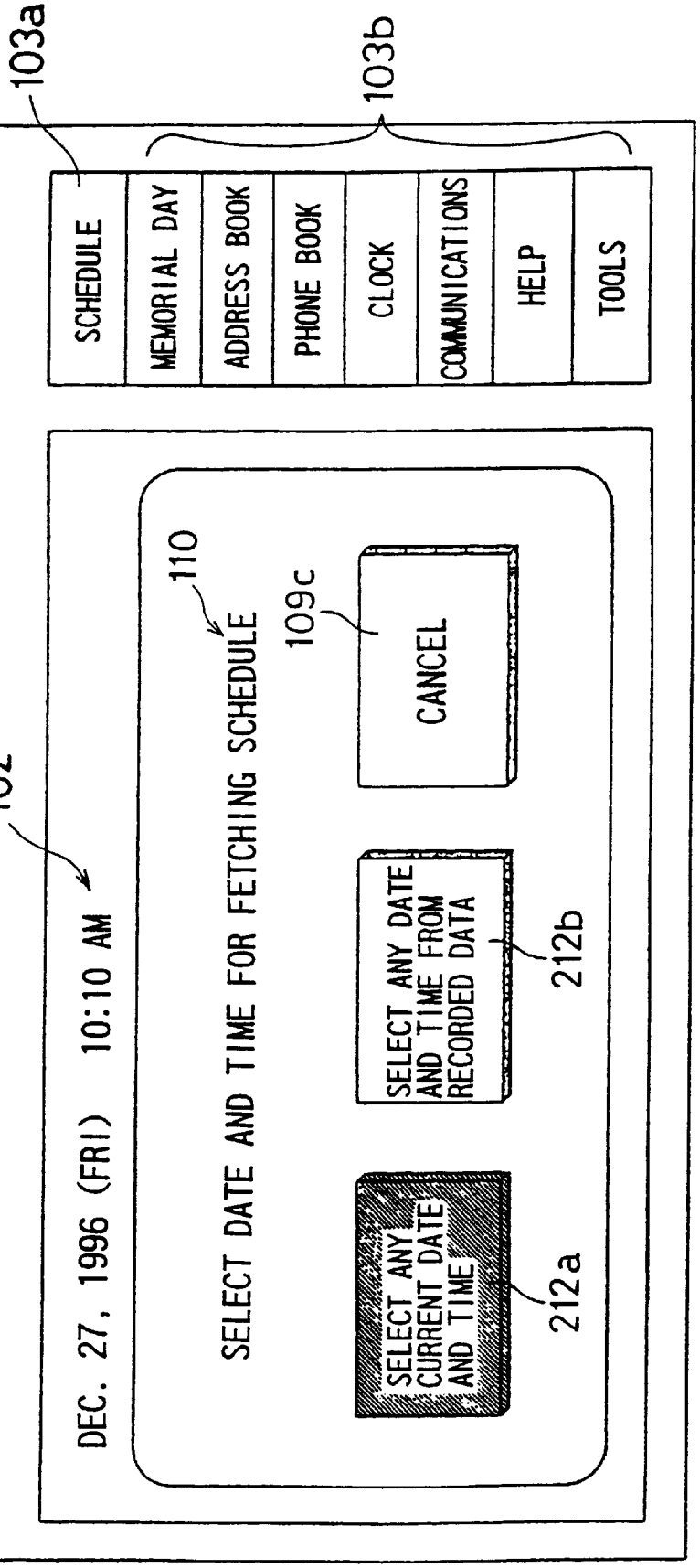
FIG. 20 illustrates the data source selecting screen 211 of the data processing apparatus 1.

In steps c7 to c12, the central controller 14 functions as date and time type selecting circuit. Consequently, the central controller 14 displays the date and time selecting screen 211 shown in FIG. 20 on the liquid crystal display unit 28 in step c7. The date and time selecting screen 211 is the same as the date and time selecting screen 108 shown in FIG. 7 except that the buttons 109a and 109b on the screen 108 are replaced with the buttons 212a and 212b. The button 212a is used to select the current date and time clocked by the clocking unit 13 and the button 212b is used to select another processing related to date and time selection. Then, the central controller 14 instructs the input/output unit to move the pen down in step c8 and read the point in step c9. Furthermore, the controller 14 references to the coordinates read in step c9 in step c10 to judge whether or not the button 212a is pressed. When judged NO, the controller moves from step c10 to step c11. The processings in steps c11 and c12 are equal to those in steps b11 and b12. When the button 212a is pressed, the controller 14 moves from step c10 to step c13. The processings in steps c13 to c33 are equal to those in steps b13 to b33.

In step c34, the sending/receiving controller 43 disconnects the line and ends fetching of voices. After the line is disconnected, by the data transmitter/receiver 44, the voice stored in the recorded voice memory 63 is stored in the voice memory for working 64. After this, the central controller 14 functions as voice/character code converting circuit 53a to convert a voice stored in the voice memory for working 64 to a character string and stores the character string in the recorded voice/character code memory 65.

The central controller 14 then functions as date and time setting circuit for setting the date and time assumed as attribute data of the voice and the character string. At first, the date and time setting circuit stores the current date clocked by the clocking unit 13 in the display memory 41 and in the transferred date memory 66 respectively. Then, the date and time setting circuit stores the current time clocked by the clocking unit 13 in the display memory 41 and in the transferred time memory 67 respectively. This current date and time are represented by, for example, predetermined date and time words. The date and time notation method is standardized.

Figure 21:
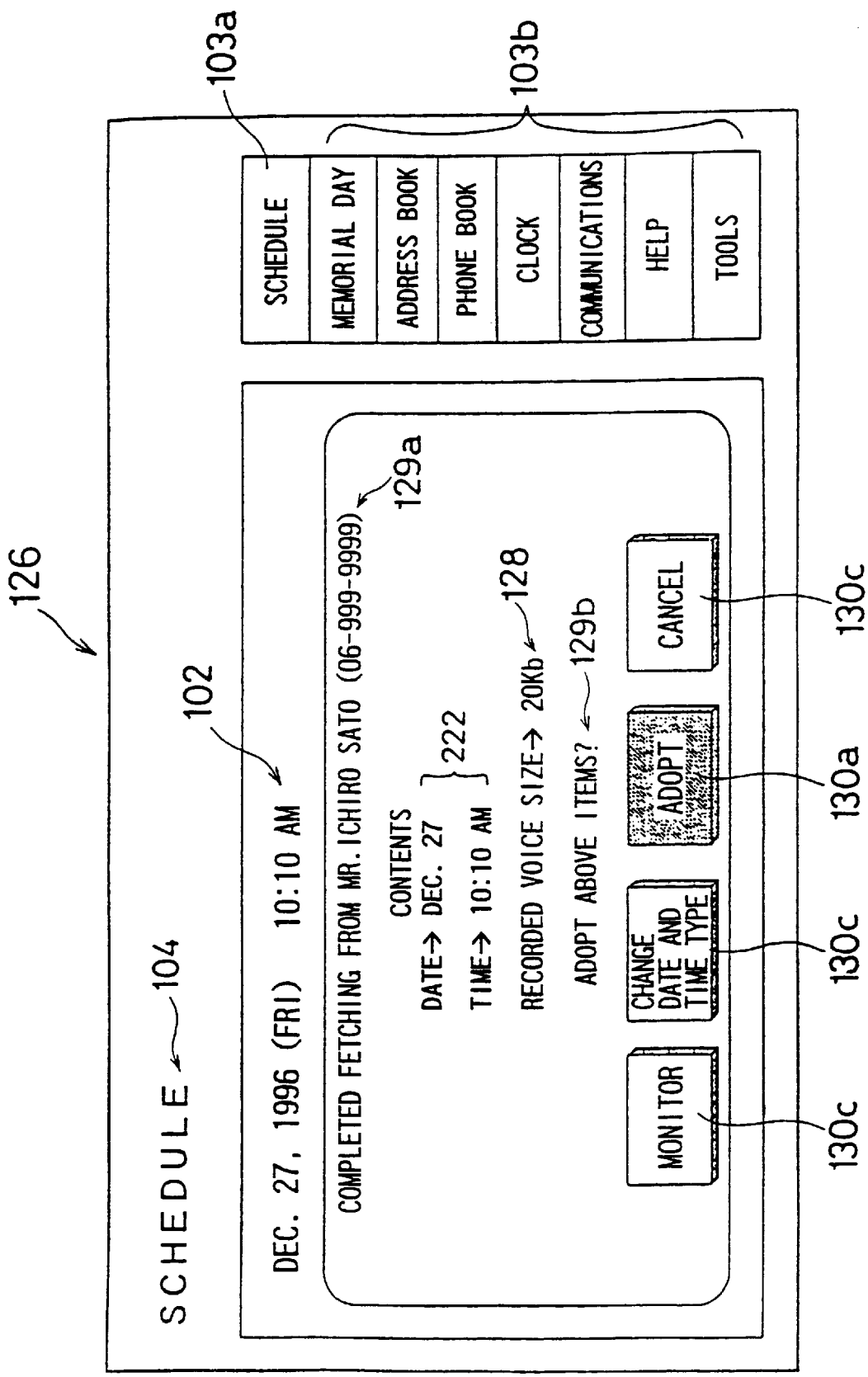
FIG. 21 illustrates the fetching completion screen 221 of the data processing apparatus 1.

In steps c35 to c40, the central controller 14 functions as output controlling circuit. Consequently, the central controller 14 displays the fetching completion screen 221 shown in FIG. 21 on the liquid crystal display unit 28 in step c35. The method for displaying the fetching completion screen 221 is the same as that in step b35 except that the current date and time are stored in the display memory 41. The fetching completion screen 221 is the same as the fetching completion screen 126 shown in FIG. 11 except that the fetching completion screen 221 includes a message 222 for displaying the current date and time instead of the message 127 for displaying detected date and time. The processings in steps c36 to c40 are equal to those in steps b13 to b33. After the voice, the character string, the date, and the time are stored in the schedule memory 70, the operation of the schedule management function is ended. Consequently, the current date and time are associated with the voice and character string as attribute data, respectively.

With the series of processings described above, the second voice processing apparatus 51y can associate date and time with schedule data entered by voice as attribute data before outputting the schedule data. In addition, since the date and time are the current date and time, it is possible to associate date and time data with the voice and character string even when no date and time related data exists in any voice. Thus, the voice and the character string can be used by other units that require attribute data for processing voices and character strings. This is why it is possible to improve the efficiency for handling voices and character strings. Furthermore, since this attribute data is provided automatically, the operation of the data processing apparatus 1 becomes easier. For example, when this data processing apparatus 1 is used to keep a diary, the diary text can be entered by voice and the text can be recorded at least either by voice or by character string. Furthermore, since the date and time when the voice is entered are added to the voice and the character string as attribute data, it is possible to manage the voice and the character string as a diary text on the date and time when the voice is entered.

Figure 22:
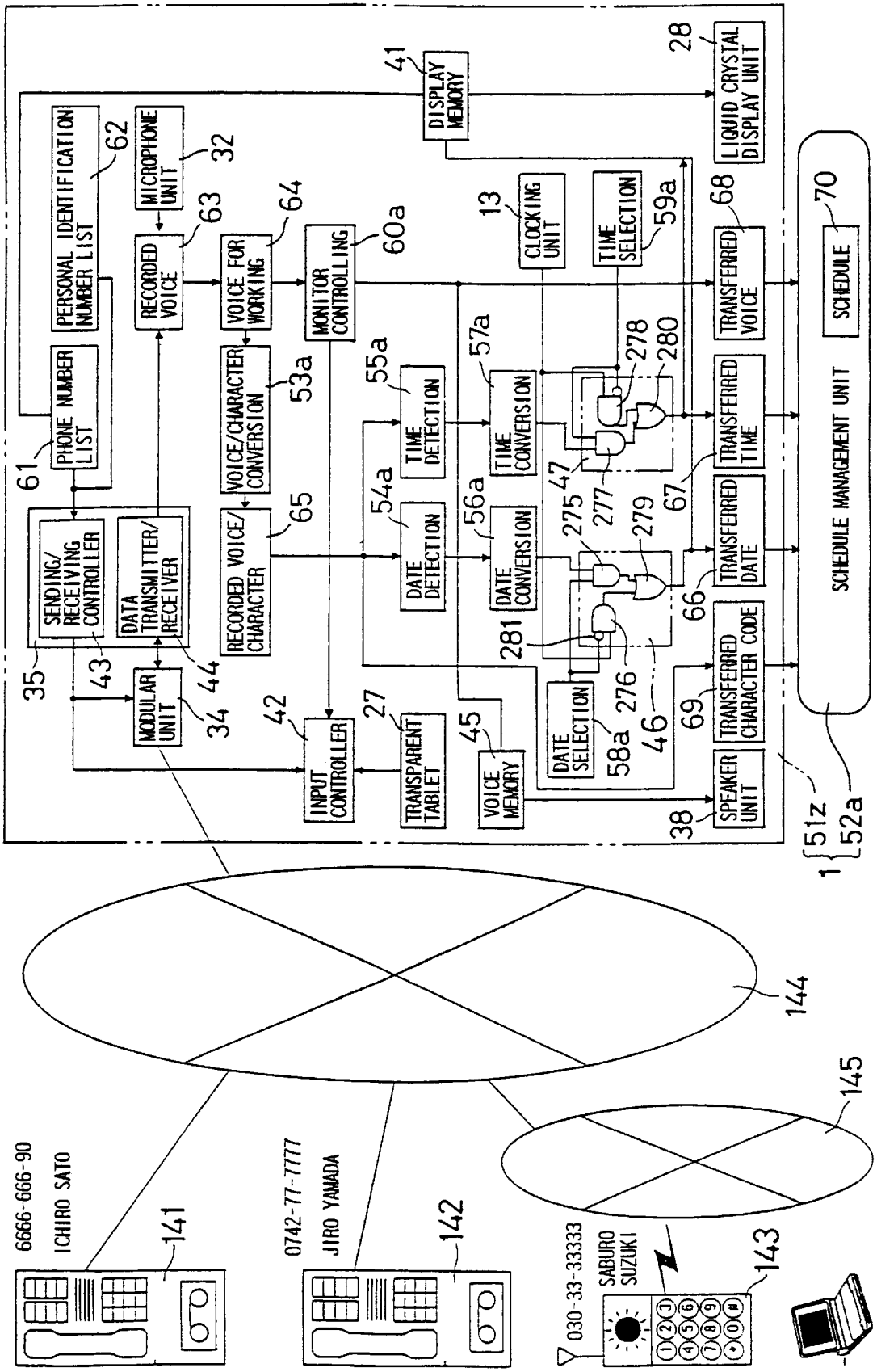
Figure 23:
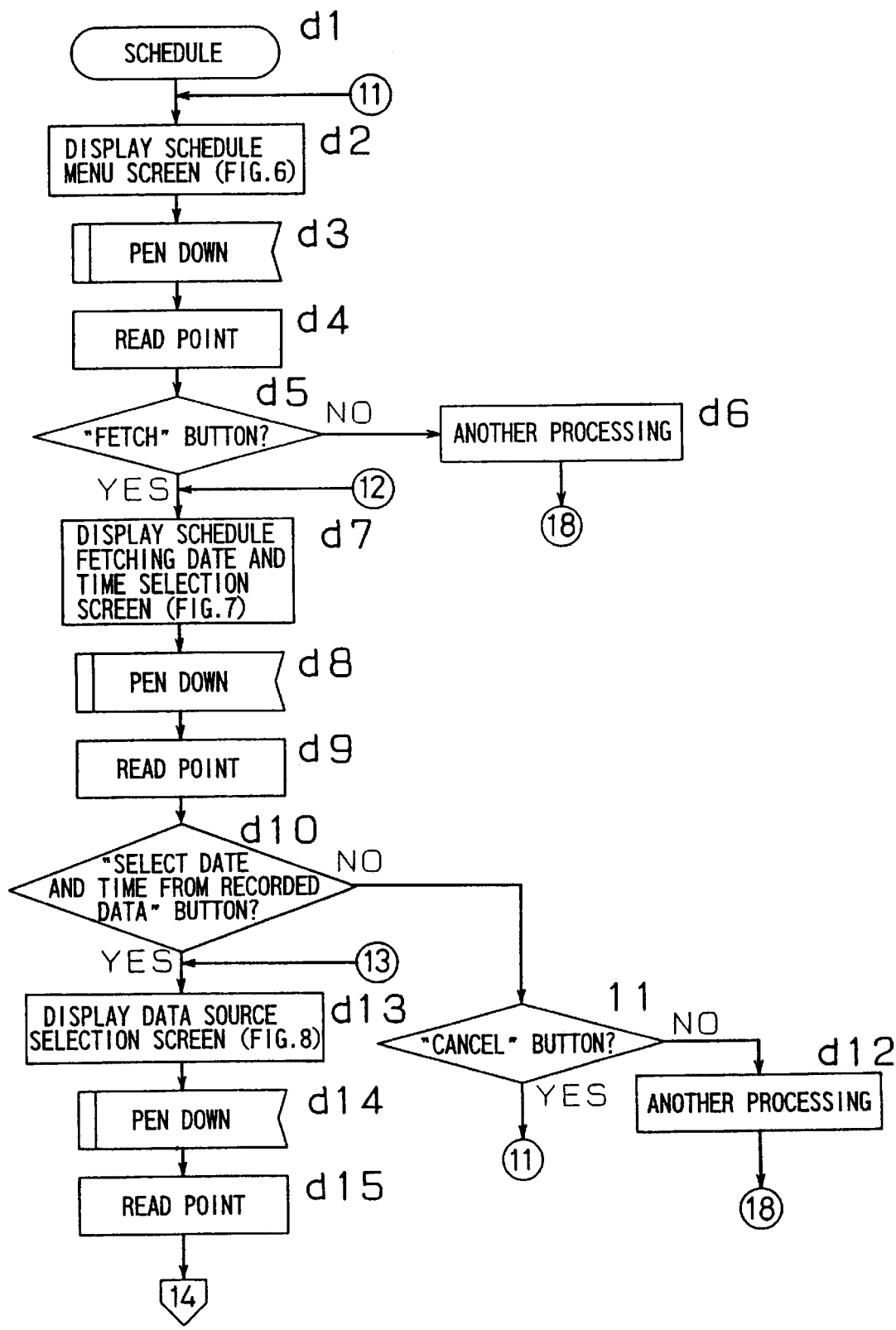
FIG. 23 is a flow chart describing the schedule management function including the third voice processing.
Figure 24:
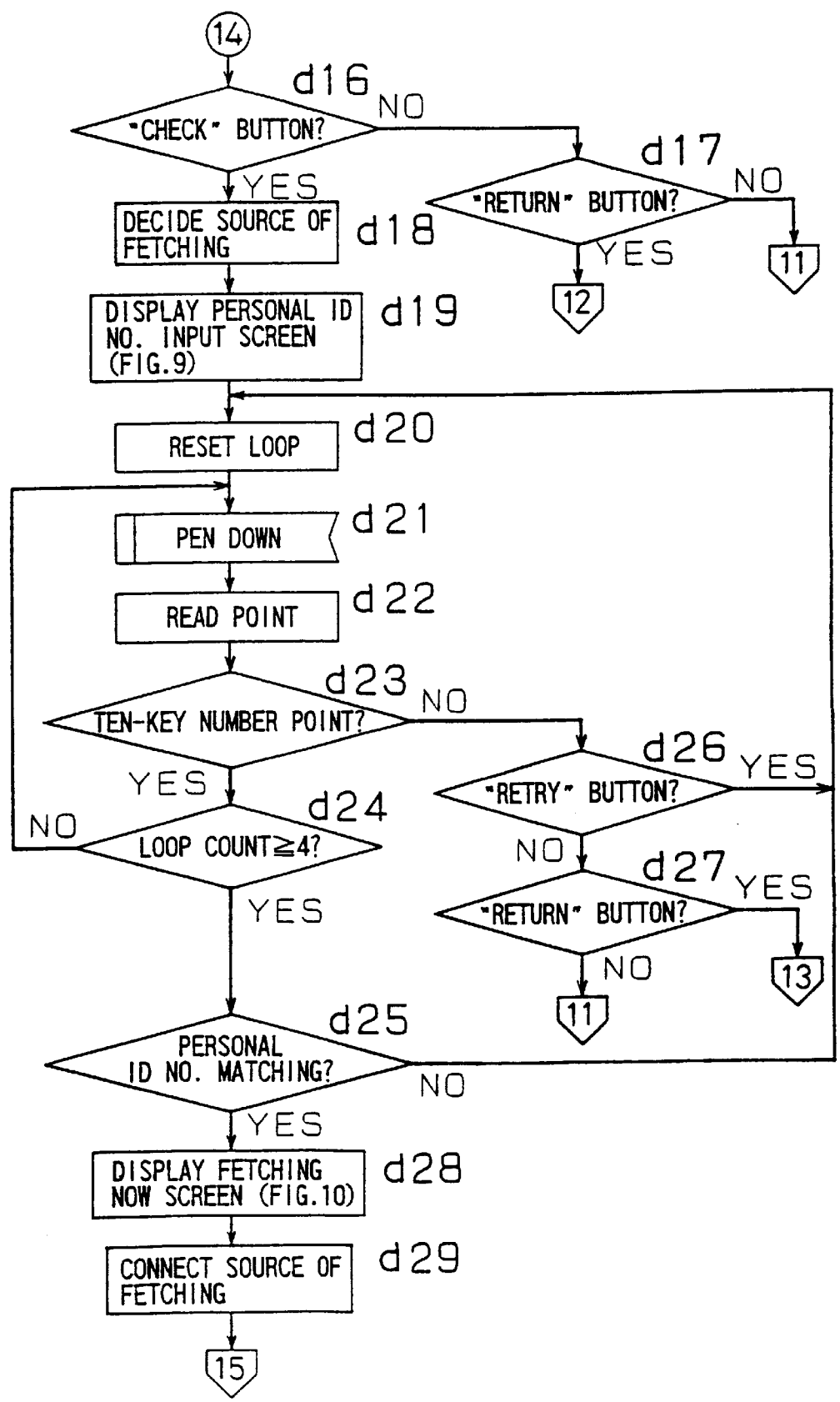
FIG. 24 is a flow chart describing the schedule management function including the third voice processing.
Figure 25:
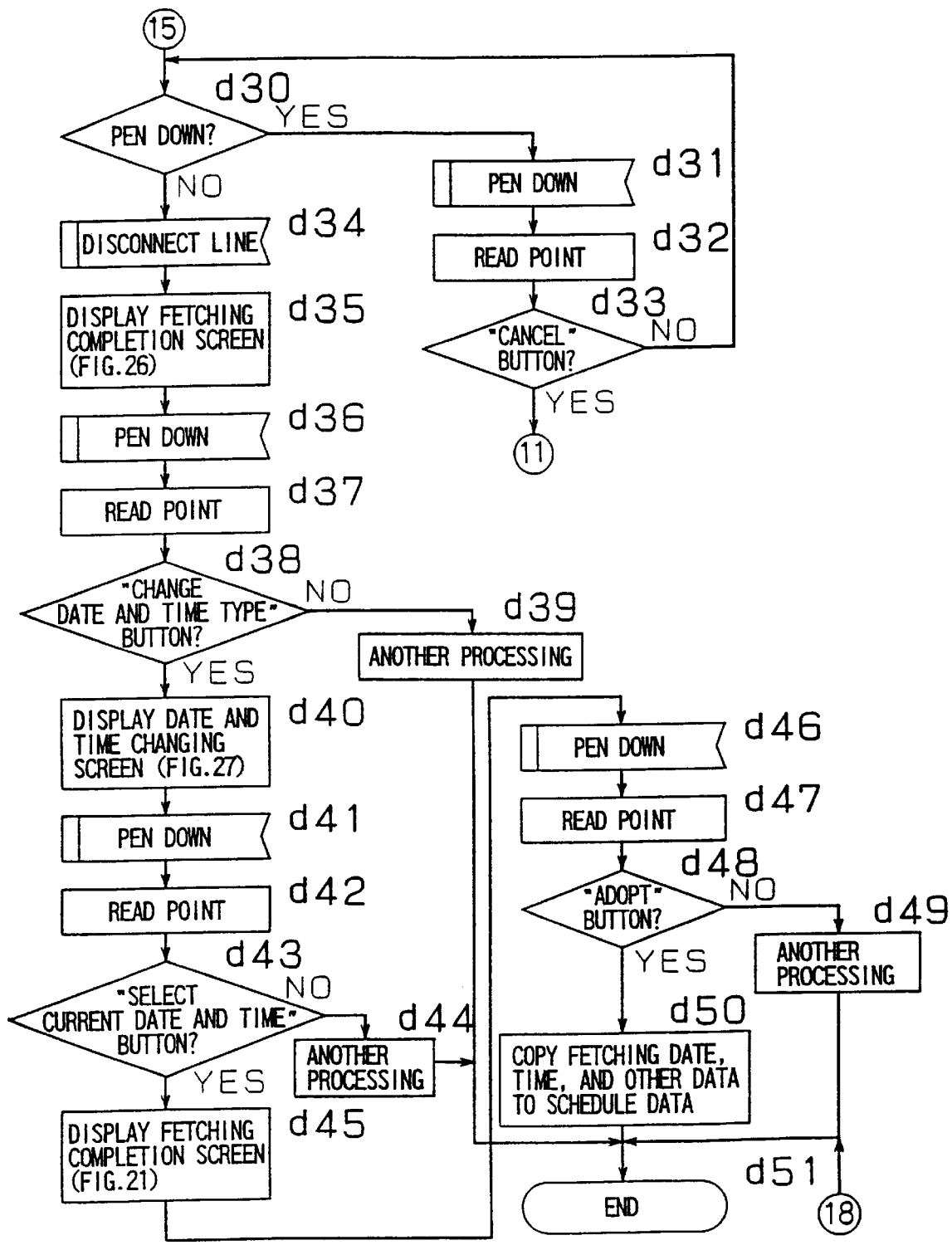
FIG. 25 is a flow chart describing the schedule management function including the third voice processing.

FIG. 22 is a block diagram for a functional configuration of the data processing apparatus 1, which functions as the third voice processing apparatus 51z and the schedule management unit 52a. FIGS. 23 to 25 are flow charts describing the schedule management function including the third voice processing. When an execution of the schedule management function in the flow chart shown in FIG. 5 is selected, if the schedule management function program shown in FIGS. 23 to 25 is executed, then the data processing apparatus 1 is composed functionally of the third voice processing apparatus 51z and the schedule management unit 52a. The third voice processing apparatus 51z is used as input device of the schedule management unit 52a. The functional configuration in such a case is the same as the function configuration of the case shown in FIG. 12 except that a clocking unit 13, multiplexers 46 and 47, date selecting circuit 58a, and time selecting circuit 59a are provided newly.

The multiplexer 46 is composed of two AND circuits 275 and 276, an OR circuit 279, and a NOT circuit 281. The output terminals of the AND circuits 275 and 276 are connected to the two input terminals of the OR circuit 279, respectively. The output terminal of the NOT circuit 281 is connected to one of the two input terminals of the AND circuit 276. The signal from the date selecting circuit 58a is supplied to one input terminal of the AND circuit 276 via the NOT circuit 281. The signal outputted from the clocking unit 13 is supplied to the other input terminal of the AND circuit 276. The signal outputted from the date selecting circuit 58a is supplied to one input terminal of the AND circuit 275 as is. And, the signal outputted from the date converting circuit 56a is applied to the other input terminal of the AND circuit 275. The signal outputted form the OR circuit 279 is applied to the display memory 41 and the transferred date memory 66 respectively. The multiplexers 46 and 47 are structured completely in the same way. Connections to peripheral devices are also the same in both multiplexers 46 and 47 except that the date converting circuit 56a, the date selecting circuit 58a, and the transferred date memory 66 in the multiplexer 46 are replaced with the time converting circuit 57a, the time selecting circuit 59a, and the transferred time memory 67 in the multiplexer 47 respectively.

Hereunder, the third voice processing included in the schedule management function will be described in detail with reference to FIGS. 22 to 25. The flow charts shown in FIGS. 23 to 25 include steps in which the same processings as those shown in FIGS. 13 to 15 are performed. Thus, description of those steps will be omitted here.

When the processing in step a5 shown in the flow chart in FIG. 5 is executed, the central controller 14 moves to step d2 from step d1. The processings in steps d2 to d33 are equal to those in steps b2 to b33. In step d34, the sending/receiving controller 43 disconnects the line and ends fetching of a voice. After the line is disconnected, by the data transmitter/receiver 44, a voice stored in the recorded voice memory 63 is stored in the voice memory for working 64. Then, the central controller 14 functions as voice/character code converting circuit 53a to convert a voice stored in the voice memory for working 64 to a character string and stores the character string in the recorded voice/character code memory 65.

Then, the central controller 14 reads the sub-control program of the date selection 58 from the memory 16 and executes the program to function as date selecting circuit 58a. The data selecting circuit 58a turns on the control signal for controlling the multiplexer 46 and transmits the turned-on control signal to the multiplexer 46. The turned-on control signal is, for example, on the high signal level. In the multiplexer 46, when the control signal is turned on, the AND circuit 276 does not output signals entered from the other input terminal and the AND circuit 275 outputs signals entered from the other input terminal as are. Consequently, the multiplexer 46 enables the outputted from the date converting circuit 56a to be outputted from the OR circuit 279.

After this, the central controller 14 functions as date detecting circuit 54a and detects the date part of a character string stored in the recorded voice/character code memory 65. Then, the central controller 14 functions as date converting circuit 56a to convert the detected date part to a predetermined date word corresponding to the detected date. The signal for representing the date with the date word is stored in the display memory 41 and in the transferred date memory 66 respectively via the multiplexer 46. At this time, the signal representing a date clocked by the clocking unit 13 is blocked by the multiplexer 46. Thus, the signal is not stored in any of the memories 41 and 66.

After this, the central controller 14 reads the sub-control program of the time selection from the memory 16 and executes the program to function as time selecting circuit 59a. The time selecting circuit 59a turns on the control signal for controlling the multiplexer 47 and supplies the turned-on control signal to the multiplexer 47. The operation of the multiplexer 47 performed in response to the control signal is the same as that of the multiplexer 46. Consequently, the output from the time converting circuit 57a can be outputted from the OR circuit 280.

After this, the central controller 14 functions as time detecting circuit 55a and detects the time part of the character string stored in the recorded voice/character code memory 65. Then, the central controller 14 functions as time converting circuit 57a to convert the detected time part to a predetermined time word corresponding to the detected time. The signal of the time represented by the time word is stored both in the display memory 41 and in the transferred time memory 67 via the multiplexer 47. At this time, the signal of the date clocked by the clocking unit 13 is blocked by the multiplexer 47, so that the signal is not stored in any of the memories 41 and 67.

Such way, the date selecting circuit 58a and the time selecting circuit 59a output either the signal representing the date and time converted by the date converting circuit 56a and the time converting circuit 57a or the signal representing the current date and time clocked by the clocking unit 13 to the multiplexers 46 and 47 in response to the result of the date type selection by the user. In step d34, the above processing is performed, since a selection is made so as to use the detected date and time as attribute data in step d10. The date selecting circuit 58a and the time selecting circuit 59a, as well as the multiplexers 46 and 47 are combined to compose circuit for controlling selection of attribute data used to output a plurality of attribute data, for example, to output either the detected date and time or the current date and time selectively.

Figure 26:
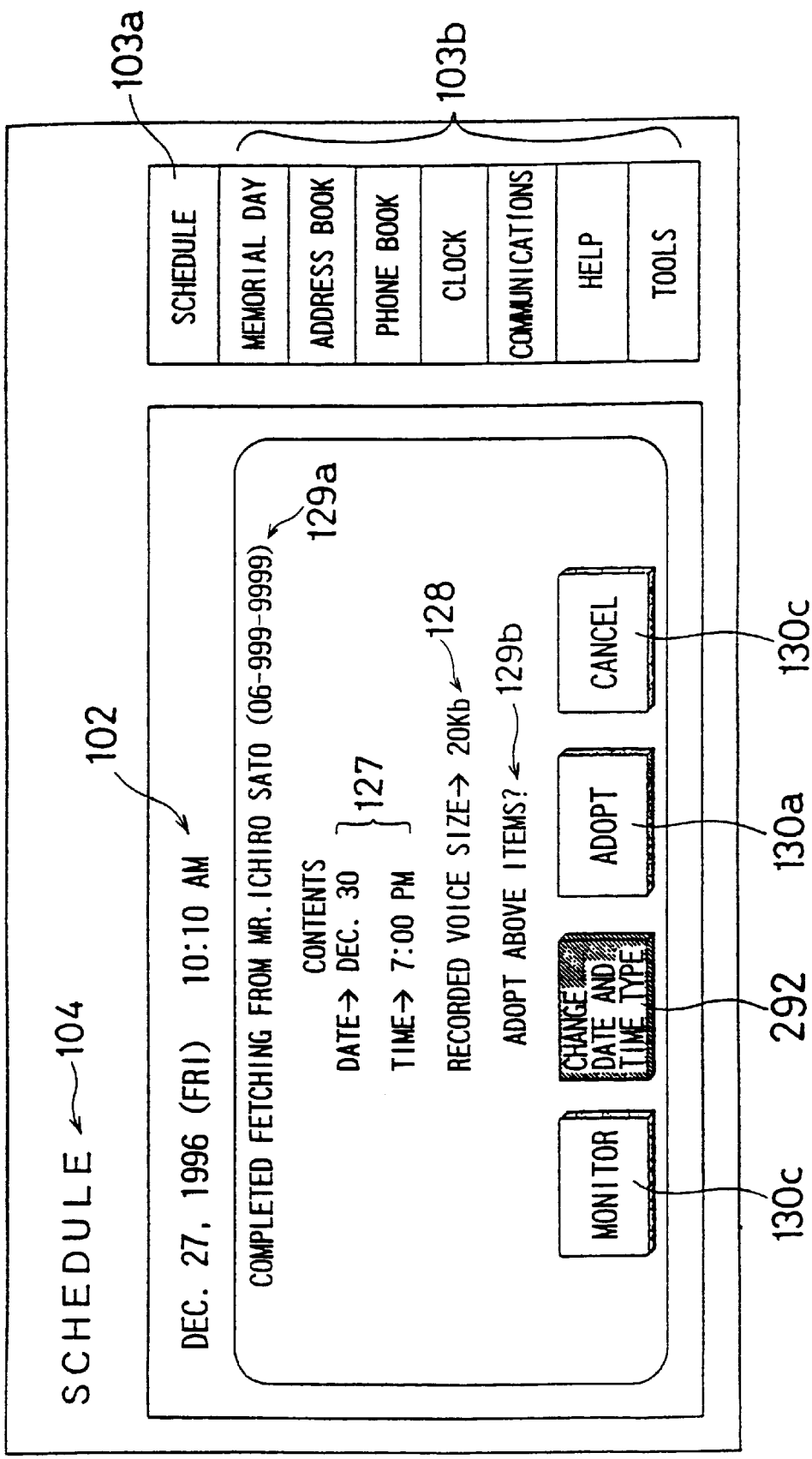
FIG. 26 illustrates the fetching completion screen 291 of the data processing apparatus 1.

In steps d35 to d40, the central controller 14 functions as output controlling circuit. Consequently, the central controller 14 displays the fetching completion screen 291 shown in FIG. 26 on the liquid crystal display unit 28 in step d35. The fetching completion screen 291 is the same as the fetching completion screen 126 shown in FIG. 11 except that the screen 291 is newly provided with a button 292 for changing a date and time type. Then, the controller 14 instructs the input/output unit to move a pen down in step d36 and reads the point in step d37.

In step d38, the central controller 14 references to the coordinates read in step d37 and judges whether or not the button 292 is pressed. When judged NO, the controller 14 moves to step d39 from step d38 and executes processings corresponding to the pressed buttons 130a and 130c to exit the processings in the flow chart in step d51. For example, when the button 130a is pressed for deciding "adoption", the controller 14 performs the processing in step b40 thereby to adopt the date and time stored in the transferred date memory 66 and in the transferred time memory 67 respectively, that is, adopts the date detected in the voice as attribute data. When the button 130c is pressed to specify another processing, the controller 14 performs the processing. When the button 292 is pressed, the controller goes to step d40 from step d38.

Figure 27:
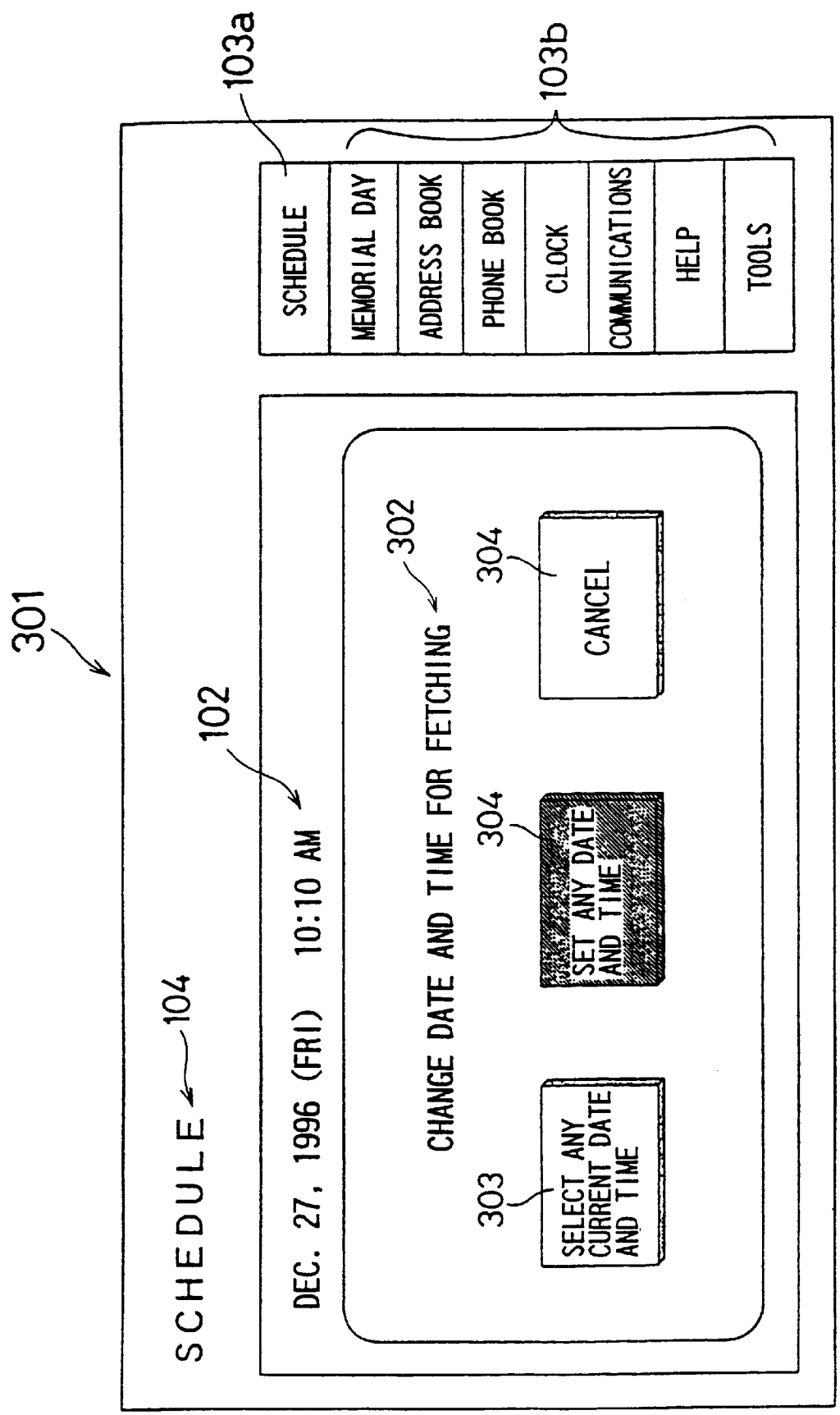
FIG. 27 illustrates a date and time changing screen 301 of the data processing apparatus 1.

In steps d40 to d44, the central controller 14 functions as date and time type changing circuit for changing any date and time type to be adopted as attribute data. Consequently, the central controller 14 displays the date and time changing screen 301 shown in FIG. 27 on the liquid crystal display unit 28 in step d40 at first. The date and time changing screen 301 includes buttons 103a and 103b used to select the current date and time 102 and another function, as well as a button 303 used to select changing the date and time type to the current date and time and a button 304 used to select another processing related to changing of the date and time type.

Then, the central controller 14 instructs the input/output unit to move a pen down in step d41 and reads the point in step d42. In step d43, the controller 14 references to the coordinates read in step d42 to judge whether or not the button 303 is pressed. When judged NO, the controller 14 goes to step 44 from step d43 to perform another processing corresponding to the pressed button 304 and exits the processing of the schedule management function in step d51. Another processing performed corresponding to the button 304 is, for example, a processing for associating any date and time set freely by the user with a voice and a character string as attribute data independently of any date and time detected from a voice and the current date and time. In this case, when the button 304 is pressed, the controller 14 prompts the user to enter any date and time at first, then stores the entered date and time in the transferred date memory 66, in the transferred time memory 67 and in the display memory 41 respectively.

When judging that the button 303 is pressed in step d43, the central controller 14 functions as date selecting circuit 58a at first. Since it is selected that the current date and time are set as attribute data at this time, the date selecting circuit 58a turns off the control signal for controlling the multiplexer 46 and supplies the turned-off control signal to the multiplexer 46. The turned-off control signal is on the low signal level, for example. When the control signal is off, the multiplexer 46 enables the AND circuit 276 to output signals entered from the other input terminal as are and disables the AND circuit 275 to output signals entered from the other input terminal. Consequently, the multiplexer 46 enables the OR circuit 279 to output the signal representing the current date clocked by the clocking unit 13. Thus, the signal from the clocking unit 13, passing the multiplexer 46, is stored in the display memory 41 and in the transferred date memory 66 respectively. The signal from the date converting circuit 56 is blocked by the multiplexer 46 at this time, so that the signal is not stored in any of the memories 41 and 66.

After this, the central controller 14 functions as time selecting circuit 59a. Since it is selected that the current date and time are set as attribute data at this time, the time selecting circuit 59a turns off the control signal for controlling the multiplexer 47 and supplies the turned-off control signal to the multiplexer 47. The operation of the multiplexer 47 to be performed in response to the control signal is the same as that of the multiplexer 46. Consequently, the signal representing the time clocked by the clocking unit 13, passing the multiplexer 47, is stored in the display memory 41 and in the transferred time memory 67 respectively. Since the signal representing the date clocked by the clocking unit 13 is blocked by the multiplexer 47 at this time, the signal is not stored in any of the memories 41 and 67.

In steps c45 to c50, the central controller 14 functions as output controlling circuit again. Consequently, the controller 14 displays the fetching completion screen on the liquid crystal display unit 28 in step c45 at first. Since the current date and time are stored in the display memory 41 at this time, the fetching completion screen is the same as the screen 221 shown in FIG. 21. The processings in steps c45 to c50 are equal to those in steps b35 to b40. After the voice, the character string, the date, and the time are stored in the schedule memory 70, the controller 14 exits the processing of the schedule management function.

When the processings in steps d38 to d47 are added between steps b37 and b38 for the first voice processing such way as described above, it is possible to select and set either of any detected date and time or the current date and time as attribute data after the date and time detected in a voice are fetched once as an attribute data candidate. Consequently, any date and time desired by the user can be set as attribute data. The controllability of the voice processing apparatus 1 can thus be improved more significantly.

In the case of the third voice processing apparatus 51z, either the current date and time or any date and time detected in a voice may be selected and set as attribute data after the current date and time are fetched once as an attribute data candidate. In this case, the voice processing is performed as follows. A button for selecting any detected date and time is added to the date and time changing screen 301. In addition, processings in steps d38 to d47 are added between steps c38 and c40 in each of the flow charts shown in FIGS. 17 to 19. Then, an turned-off control signal is supplied to the multiplexers 46 and 47 respectively in step c34 and a turned-on control signal is applied to the multiplexers 46 and 47 in step d43. The date detecting circuit 54a and time detecting circuit 55a, as well as the date converting circuit 56a and time converting circuit 57a are started at this time. Consequently, just after any detected date and time are selected, the date and time part can be detected and adopted as attribute data even when neither date nor time is detected in a voice beforehand.

In the above voice processing apparatuses 51x and 51y, either any date and time detected in a voice or the current date and time are fetched as attribute. In the voice processing apparatus in this embodiment, however, either the first voice processing or the second voice processing may be performed selectively. In order to do so, for example, the processings in steps c13 to c40 in any of the flow charts shown in FIGS. 17 to 19 are performed as another processing in step b12 in any of the flow charts shown in FIGS. 13 to 15. Consequently, the user can select the desired date and time type appropriately to the circumstances at that time. The controllability of the voice processing apparatus thus becomes easier. Furthermore, in this case, the date and time fetched in steps b34 and c34 may be changed later just like in the third voice processing. Even in this case, the date and time fetched once can be changed selectively and appropriately to the circumstances at that time by the user. The controllability of the voice processing apparatus is thus improved more significantly. In addition, in any of the above voice processing apparatuses, any date and time set freely by the user may be set as attribute data independently of any detected date and time, as well as the current date and time. In this case, when the detected date and time, as well as the current date and time do not match with the expected items represented by a voice and a character string, the user can set any date and time appropriately to the expected items. The controllability of the voice processing apparatus is thus improved more significantly.

If the data processing apparatus 1 is used as a voice processing apparatus such way, it is possible to obtain a voice processing apparatus with high controllability when any date and time as attribute data candidates are decided using a plurality of methods and any date and time decided by one of the methods is selected by the user and added to a voice and a character string. In this embodiment, any date and time detected in a voice and the current date and time are assumed as attribute data candidates, but another method may be adopted to decide such date and time candidates. Furthermore, there will be three or more date and time.

Figure 28:
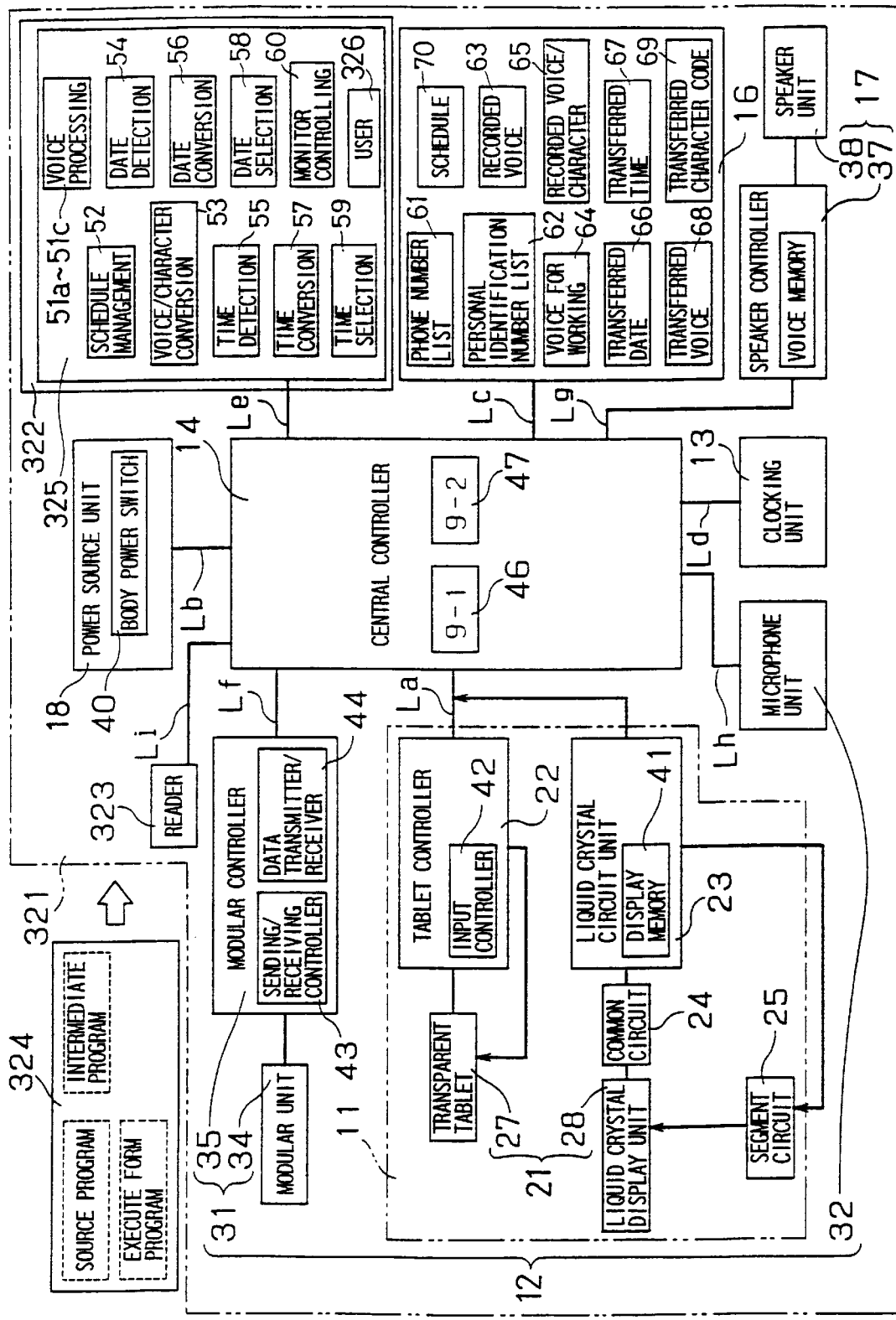
FIG. 28 is an external perspective view of the data processing apparatus 321 in the second embodiment of the present invention.

Hereunder, the data processing apparatus 321 in the second embodiment of the present invention will be described. FIG. 28 is a block diagram for an electrical configuration of the data processing apparatus 321. The external appearance of the data processing apparatus 321 is the same as that of the data processing apparatus 1 in the first embodiment. The data processing apparatus 321 is the same as the data processing apparatus 1 in the first embodiment except that the memory 15 is replaced with a writable memory 322 and a medium reader 323 is added newly. Hereunder, the same numerals will be given to the same components in structure and action as those in the data processing apparatus 1, avoiding redundant description.

A reader 323 is connected to the central controller 14 via a control line Li. This reader 323 is provided with a medium 324 removably from outside of the data processing apparatus 321. The medium 324 stores software including programs and data used to execute various processings described in the first embodiment. The reader 323 reads software programs stored in this medium 324 and stores them in the program memory unit 325 and the memory 16 of the memory 322 respectively. This software programs include at least the main control program of the schedule management function, the main control program of the first to third voice processings, as well as sub-control programs for voice/character code conversion, date detection, time detection, date conversion, time conversion, date selection, time selection, and monitor controlling. In addition, the programs also include a user program 326 used by the user appropriately to his/her purpose. After the software is stored in both memories 322 and 16, the medium 324 may be removed from the reader 323.

The medium 324 may be a CD-ROM, a floppy disk, or an IC card, for example. This software is stored, for example, in the format of source programs, intermediate code programs, execute form programs, etc. When an execute form program is read by a data processing apparatus, the data processing apparatus can perform processing to be executed by the program by executing the program as is. When a source program and an intermediate program are read by a data processing apparatus, the data processing apparatus can construct the execute form program based on the program read. The memory 322 may be a writable/erasable nonvolatile memory, more concretely, an $E^2PROM$ or a flash memory, for example, or may be a random access memory. This memory may also be an external memory such as a hard disk unit.

The central controller 14 reads and executes the programs stored in this memory 322 thereby to realize each of the functional configurations described in FIGS. 12, 16, and 22 and control each of components 11 to 18. Consequently, the data processing apparatus 321 functions as the schedule management unit 52a, as well as any of the first to third voice processing apparatuses 51x to 51z. For example, when a related art data processing apparatus, which is a computer provided with a modem or a microphone or both of them, reads software stored in the medium 324 and executes the programs of this software in the central processing circuit, therefore, it is possible to execute the same processings as those in the data processing apparatus 1 in the first embodiment. Consequently, the data processing apparatus 1 can be realized easily.

Although any date and time are set as attribute data in the data processing apparatuses 1 and 321 in the first and second embodiments respectively, the attribute data may be any one as long as it indicates the attribute of a voice and a character string. For example, a place name may be used as attribute data. And, although both voice and character string are outputted as schedule data, the schedule data may be either of them or both of them when outputting with corresponding attribute data. Either or both may be selected according to either or both of voice and character string are used by an apparatus that uses any of the voice processing apparatuses 51x to 51z as an input unit, for example. Furthermore, although the voice processing apparatuses 51x to 51z are used as an input unit of the schedule management unit 52a respectively, they may be used independently if at least either a character string or a voice to which attribute data is associated is outputted. They may also be used as an input unit for another apparatus respectively. For example, they may be used to enter names and addresses when a data processing apparatus manages names and addresses of persons. In addition to voices, each of the voice processing apparatuses 51x to 51z may convert any sounds if they can be converted to character strings.

Although each of the voice processing apparatuses 51x and 51z uses the part detected by the date detecting circuit 54a and the time detecting circuit 55a and converted by the date converting circuit 56a and the time converting circuit 57a, it is possible to use any detected part as is. In addition, each of the memories included in any of the functional configurations of the voice processing apparatuses 51a to 51z is used to store a voice, a character string, and any date and time temporarily. Some or all of those memories may be omitted unless it is needed to store any of those data items temporarily.

Furthermore, each of the voice processing apparatuses 51x to 51z is only required in minimum to output date and time associated with a character string as attribute data after an entered voice is converted to a character string. Some or all of the processings of the central controller 14 for selecting date and time type selection, data source selection, personal identification number entry, and whether to adopt schedule data by the user may be omitted. Performing of each of those processings can make it easier to improve the controllability of each of the voice processing apparatuses 51x to 51z and make it easier to use the unit. In addition, although the data processing apparatus 1 stores the first to third voice processing programs, it may store only any one of those programs in minimum. Because, each of those programs can be executed independently of others. And, although the central controller 14 executes programs to function as various circuit in the data processing apparatus 1 in the first embodiment, some or all of those circuit may be provided as respective components.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A voice processing apparatus comprising:
voice inputting device for inputting a voice;
voice/character string converting circuit for converting the inputted voice to a character string consisting of a plurality of characters;
attribute data detecting circuit for detecting a part of the character string representing a predetermined attribute as attribute data which is used for classifying the voice and the character string;
attribute data converting circuit for converting the detected attribute data to at least one predetermined word corresponding with a standardized format; and
outputting device for outputting at least either the voice or the character string and the attribute data in association with each other.

2. The voice processing apparatus of claim 1, wherein the predetermined attribute is date and time.

3. A voice processing apparatus comprising:
voice inputting device for inputting a voice;
voice/character string converting circuit for converting the inputted voice to a character string consisting of a plurality of characters;
attribute data setting circuit for setting attribute data which represents a predetermined attribute, the attribute data being used for classifying the voice and the character string, wherein the predetermined attribute is not represented by any part of the character string; and
outputting device for outputting at least either the voice or the character string and the attribute data in association with each other.

4. The voice processing apparatus of claim 3, further comprising:

clocking device for clocking the current date and time, wherein the attribute data setting circuit sets the current date and time clocked by the clocking device as attribute data when a voice is inputted from the voice inputting device.

5. A voice processing apparatus comprising:

voice inputting device for inputting a voice;

voice/character string converting circuit for converting the inputted voice to a character string consisting of a plurality of characters;

attribute data detecting circuit for detecting a part of the character string representing a predetermined attribute as a first attribute data which is used for classifying the voice and the character string;

attribute data setting circuit for setting a second attribute data representing the predetermined attribute, the second attribute data being used for classifying the voice and the character string;

attribute data selecting circuit for selecting either the first or second attribute data; and outputting device for outputting at least either the voice or the character string and the attribute data selected by the attribute data selecting circuit in association with each other.

6. The voice processing apparatus of claim 5, further comprising:

clocking device for clocking the current date and time, wherein the predetermined attribute is date and time, and the attribute data setting circuit sets the current date and time clocked by the clocking device as a second attribute data when the voice is inputted from the voice inputting device.

7. The voice processing apparatus of any one of claims 2, 4 or 6, further comprising:

schedule storing device for storing a schedule with an associated date and time, wherein the attribute data outputted from the outputting device is stored in the schedule storing device as date and time, and at least either the voice or the character string outputted from the outputting device is stored in the schedule storing device as an expected item on the date and time.

8. A method for processing voices comprising the steps of:

allowing voice input;

converting the voice to a character string consisting of a plurality of characters;

detecting a part of the character string representing a predetermined attribute as attribute data which is used for classifying the voice and the character string;

converting the attribute data to at least one predetermined word corresponding with a standardized format; and associating at least either the voice or the character string with the attribute data.

9. A method for processing voices comprising the steps of:

allowing voice input;

converting the voice to a character string consisting of a plurality of characters;

setting attribute data representing a predetermined attribute, the attribute data being used for classifying the voice and the character string wherein the predetermined attribute is not represented by any part of the character string; and associating the attribute data with at least either the voice or the character string.

10. A method for processing voices comprising the steps of:

allowing voice input;

converting the voice to a character string consisting of a plurality of characters;

detecting a part of the character string representing a predetermined attribute as a first attribute data which is used for classifying the voice and the character string;

setting a second attribute data representing the predetermined attribute, the second attribute data being used for classifying the voice and the character string;

selecting either the first or the second attribute data; and associating the selected attribute data with at least either the voice or the character string.

11. A computer program stored on a computer readable storage medium, comprising the processing of:

allowing voice input;

converting the voice to a character string consisting of a plurality of characters;

detecting a part of the character string representing a predetermined attribute as attribute data which is used for classifying the voice and the character string;

converting the attribute data to at least one predetermined word corresponding with a standardized format; and outputting at least either the voice or the character string and the attribute data in association with each other.

12. A computer program stored on a computer readable storage medium, comprising the processing of:

allowing voice input;

converting the voice to a character string consisting of a plurality of characters;

setting attribute data representing a predetermined attribute, the attribute data being used for classifying the voice and the character string, wherein the predetermined attribute is not represented by any part of the character string; and outputting at least either the voice or the character string and the attribute data in association with each other.

13. A computer program stored on a computer readable storage medium, comprising the processing of:

allowing voice input;

converting the voice to a character string consisting of a plurality of characters;

detecting a part of the character string representing a predetermined attribute as a first attribute data which is used for classifying the voice and the character string;

setting a second attribute data representing the predetermined attribute, the second attribute data being used for classifying the voice and the character string;

selecting either the first or the second attribute data; and outputting at least either the voice or the character string and the selected attribute data in association with each other.

* * * * *